US011093227B1

(12) United States Patent
Shteyman et al.

(10) Patent No.: US 11,093,227 B1
(45) Date of Patent: Aug. 17, 2021

(54) COMPUTER-AUTOMATED SOFTWARE RELEASE AND DEPLOYMENT ARCHITECTURE

(71) Applicant: TD Ameritrade IP Company, Inc., Omaha, NE (US)

(72) Inventors: Yuly Shteyman, East Brunswick, NJ (US); Jonathan M. Mell, Teaneck, NJ (US)

(73) Assignee: TD Ameritrade IP Company, Inc., Omaha, NE (US)

( * ) Notice: Subject to any disclaimer, the term of this patent is extended or adjusted under 35 U.S.C. 154(b) by 0 days.

(21) Appl. No.: 16/917,775

(22) Filed: Jun. 30, 2020

(51) Int. Cl.
*G06F 9/445* (2018.01)
*H04L 29/08* (2006.01)
*G06F 9/44* (2018.01)
*H04L 12/24* (2006.01)
*G06F 8/61* (2018.01)
*G06F 8/60* (2018.01)

(52) U.S. Cl.
CPC ............... *G06F 8/60* (2013.01); *G06F 9/445* (2013.01); *H04L 67/34* (2013.01); *H04L 67/02* (2013.01)

(58) Field of Classification Search
CPC ..... G06F 8/60; G06F 8/61; G06F 8/65; G06F 8/71; G06F 9/445; G06F 11/3688; H04L 67/34; H04L 67/02
See application file for complete search history.

(56) References Cited

U.S. PATENT DOCUMENTS 9,477,454 B2 * 10/2016 Scheiner ................... G06F 8/61

OTHER PUBLICATIONS

Nikam et al., Developing and Deploying Applications for Highly Available Storage of Cloud Service through Secured Channels, 6 pages (Year: 2016).*
Anderson, Tim; Ditch Chef, Puppet, Splunk and snyk for GitLab? That's the pitch from your new wannabe one-stop DevOps shop; The Register; Oct. 10, 2019; 8 pages.
Speed, Richard; Puppet to start pulling a few strings in the cloud-native world with Project Nebula; The Register; Oct. 10, 2019; 6 pages.

* cited by examiner

*Primary Examiner* — Thuy Dao
(74) *Attorney, Agent, or Firm* — Harness, Dickey & Pierce, P.L.C.

(57) ABSTRACT

A software deployment system includes a storage module, a release module, a deployment control module, and a deployment module. The storage module stores sets of deployment parameters for multiple applications. The Storage module receives a pointer to an executable form of the first application and stores the pointer as part of a first set of deployment parameters for a first application. The release module generates release objects that each identifies a specific version of one of the sets of deployment parameters. The deployment control module assigns the release objects to the environments. Subsequent to a first release object being assigned to the first environment, the deployment module configures the first environment according to the specified version of the first set of deployment parameters, copies the executable form of the first application from the location indicated by the pointer, and initiates execution of the copied executable form in the first environment.

20 Claims, 13 Drawing Sheets

COMPUTER-AUTOMATED SOFTWARE RELEASE AND DEPLOYMENT ARCHITECTURE

FIELD

The present disclosure relates to software development automation and more particularly to automated systems for continuous integration, delivery, and deployment.

BACKGROUND

A team of developers responsible for an application or microservice writes code that is embodied in source files. The source files are checked into a version control system, such as a distributed version control system such as Git. In various implementations, the distributed version control system may be a hosted platform, such as GitHub from GitHub, Inc. or Bitbucket from Atlassian Corporation Plc. According to a technique referred to as continuous integration, source code commits may trigger automatic building and testing of the application. For example, a tool such as Jenkins may be used for continuous integration. Jenkins may coordinate compiling (such as into binary or Java bytecode), packaging, and storing an executable form of the application into a binary repository, such as Artifactory from JFrog Ltd. In various implementations, Jenkins may be configured to use a build script specified by the Maven toolset from the Apache Software Foundation.

Another technique, referred to as continuous deployment, involves moving new builds into execution environments. For example, a development environment, an integration environment, and a production environment may be maintained for a project. A new build may automatically be deployed to the development environment. Then, when unit tests are passed, the build may be moved to the integration environment. Then, when the new build's compatibility with other components is verified, the production environment may be updated.

Deploying a new build into the development or integration environments may be performed using a method referred to as kill-run. According to this method, the execution of the earlier build is stopped and then the new build is executed. For the production environment, a method such as blue-green may be used. In the blue-green method, the existing build is executing in one copy of the production environment (this may be either the blue copy or the green copy, but in this example will be referred to as the blue copy). The two copies of the production environment may coexist on the same set of servers, or on different servers within the data center, or across multiple data centers. For example, one copy of the production environment may be operational while the other copy of the environment is ready to take over as a disaster recovery plan. In other cases, two pairs of production environments may be maintained, with one blue-green pair being the active environment and the other blue-green pair being the disaster recovery environment. The active environment may use the blue-green method. Once proper operation of the new build is verified in the direction environment following blue-green, the kill-run method may be used to bring the disaster recovery environment up to date.

According to the blue-green deployment method, the new build is spun up in the green copy of the production environment. Once execution of the new build is verified, the production environment is cut over to the green copy, such as by updating firewall routes, DNS entries, and/or load balancer settings. The blue copy of the environment may remain running to allow cutting back over in the event of a failure of the green copy of the environment.

Deployment to the various environments generally requires different settings. For example, an application running in an integration environment may access a different copy of a database than when executing in the production environment. In other situations, the database may remain the same but the application running in the integration environment may be granted read-only access to the database. These environment-specific configurations often require hand-crafting scripts and written instructions.

The individuals responsible for deploying applications to environments and maintaining the uptime of those environments, especially the production environment, may be operations engineers, who need to interface with the developers who wrote the source code for the applications. This interface creates administrative and scheduling issues, and makes it more difficult and time-consuming to deploy new builds frequently. Further, tracking by the operations engineers of exactly how an application is deployed in each environment may be inexact, which is especially problematic in highly regulated industries. Further, difficulties in integration are generally identified by the operations engineers and then fed back to the developers, which creates additional communication burdens and forces developers to revise features of applications after they considered development of those features to be complete.

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A software deployment system includes a storage module, a release module, a deployment control module, and a deployment module. The storage module is configured to store a plurality of sets of deployment parameters for a plurality of applications, including a first set of deployment parameters for a first application, and receive a pointer to an executable form of the first application and store the pointer as part of the first set of deployment parameters. The first set of deployment parameters includes parameters specifying deployment of the first application to a first environment of a plurality of environments. The release module is configured to generate release objects that each identifies a specific version of one of the plurality of sets of deployment parameters. The deployment control module is configured to assign the release objects to the plurality of environments. The deployment module is configured to deploy the release objects to the assigned environments according to the sets of deployment parameters identified by the release objects. A first release object corresponds to the first application and identifies a specified version of the first set of deployment parameters. The deployment module is configured to, subsequent to the first release object being assigned to the first environment: configure the first environment according to the specified version of the first set of deployment parameters; copy, to the first environment, an executable form of the first application pointed to by the specified version of the first set of deployment parameters; and initiate execution of the copied executable form in the first environment.

In other features, the first set of deployment parameters includes parameters specifying deployment of the first application to a second environment of the plurality of environments. In other features, the deployment module is configured to, subsequent to the first release object being assigned to the second environment: configure the second environment according to the specified version of the first set of deployment parameters; copy, to the second environment, an executable form of the first application pointed to by the specified version of the first set of deployment parameters to the second environment; and initiate execution of the copied executable form in the second environment.

In other features, the executable form of the first application comprises at least one of a binary file, a container image, a virtual machine image, a bytecode file, and an archive format file. In other features, the pointer is one of a uniform resource identifier (URI) and a uniform resource locator (URL). In other features, the pointer to the executable form of the first application indicates a file within an artifact repository. In other features, the storage module is configured to receive the pointer from an automated build manager that creates the executable form of the first application based on source code for the first application. In other features, the storage module is configured to receive a new version of the pointer from the automated build manager in response to creation, by the automated build manager, of a new executable form of the first application in response to revised source code for the first application.

In other features, the deployment module is configured to configure the first environment by at least one of creating a container and spooling up a virtual machine (VM). In other features, the first set of deployment parameters specifies at least one of environment variables for deployment and network routes for intercommunication with other components while deployed. In other features, the software deployment system includes a secrets control module that stores, in encrypted form, a plurality of secrets. The deployment module is configured to, in response to the first set of deployment parameters identifying a first secret, pass the first secret from the secrets control module to the executable form of the first application. In other features, the deployment module is configured to pass the first secret to the executable form as an environment variable.

In other features, the deployment control system is configured to selectively promote the first release object from the first environment to a second environment and from the second environment to a third environment. In other features, the first, second, and third environments are configured for development, integration testing, and production, respectively. In other features, the release module is configured to generate a new release object in response to a request for a release. In the new release object, the specific version of one of the plurality of sets of deployment parameters is a version of the set of deployment parameters at the time of the request. In other features, the storage module is implemented by a version control system. The first set of deployment parameters comprises at least one text file in the version control system. In the first release object, the identifier of the specified version of the first set of deployment parameters is a snapshot in time of the at least one text file in the version control system.

In other features, the software deployment system includes a release database configured to store the release objects. In other features, for each of the release objects, the specific version of the specified set of the plurality of sets of deployment parameters is immutable. In other features, the storage module is implemented by a version control system and each set of the plurality of sets of deployment parameters comprises at least one text file in the version control system. In other features, the version control system is a distributed version control system.

A software deployment system includes a release module, a deployment control module, and a deployment module. The release module is configured to generate a first release object at a first time that identifies a specific version, as of the first time, of a first set of files. The first set of files corresponds to a first application, includes at least one file stored in a version control system, and includes a first set of deployment parameters. The first set of deployment parameters includes a pointer to an executable form of the first application, first parameters specifying deployment of the first application to a first environment, and second parameters specifying deployment of the first application to a second environment. The deployment control module is configured to selectively promote the first release object to the first environment by copying the first set of files to a first location in the version control system and selectively promote the first release object to the second environment by copying the first set of files to a second location in the version control system. The first location corresponds to the first environment. The second location corresponds to the second environment. The deployment module is configured to, after the first release object is promoted to the first environment, selectively deploy the first release object to the first environment by: configuring the first environment according to the first parameters of the first set of deployment parameters; from a location specified by the pointer, copying the executable form of the first application to the first environment; and initiating execution of the copied executable form in the first environment. The deployment module is configured to, after the first release object is promoted to the second environment, selectively deploy the first release object to the second environment by: configuring the second environment according to the second parameters of the first set of deployment parameters; from the location specified by the pointer, copying the executable form of the first application to the second environment; and initiating execution of the copied executable form in the second environment.

In other features, the release module is configured to generate the first release object in response to receiving a release request at the first time. In other features, the release request specifies a set of applications including the first application for joint release. The deployment module is configured to, when deploying the first release object, deploy each application of the set of applications together. In other features, the release module is configured to, in response to the release request specifying a first tag, include the first tag in the first release object. The deployment module is configured to receive a roll specification with a specified tag and a specified environment. The deployment module is configured to, in response to the first tag matching the specified tag and the specified environment being the first environment, automatically deploy the first release object to the first environment once the first release object is promoted to the first environment. The deployment module is configured to, in response to the first tag matching the specified tag and the specified environment being the second environment, automatically deploy the first release object to the second environment once the first release object is promoted to the second environment.

In other features, an automated build manager creates the executable form of the first application based on source code for the first application and provides the pointer to the version control system. In other features, the first set of files includes at least two files stored in the version control system. A first file of the at least two files includes the pointer. The automated build manager commits the first file to the version control system upon creation of the executable form of the first application.

In other features, the first location is a first repository within a project maintained in the version control system and the second location is a second repository within the project. In other features, prior to being copied, the first set of files is located in a third repository within the project and source code for the first application is absent from the first, second, and third repositories. In other features, prior to being copied, the first set of files is located in a second project maintained in the version control system and source code for the first application is absent from the first project.

In other features, the first set of deployment parameters is encoded in the first set of files using a domain-specific language. In other features, each file of the first set of files is a text file. In other features, each file of the first set of files conforms to a YAML (YAML Ain't Markup Language) format. In other features, the first set of files includes a common file; a first file that inherits from the common file and, together with the common file, encodes the first parameters; and a second file that inherits from the common file and, together with the common file, encodes the second parameters.

In other features, the deployment module is configured to, when deploying the first release object to the first environment, use a set of intermediate objects to configure the first environment. The deployment module comprises an intermediate format compiler configured to generate the set of intermediate objects based on the first set of files. In other features, the intermediate format compiler is configured to parse a first file of the first set of files to identify whether the first file inherits from another file and, if so, parse the another file.

In other features, the intermediate format compiler is configured to parse a first file of the first set of files and identify whether the first file identifies a dependency on another component and, if so, recursively analyze the another component to determine further dependencies. The deployment module is configured to deploy the dependencies along with the first application. In other features, the intermediate format compiler is configured to recognize whether the dependency to the another component specifies an environment and, if so, cause the deployment module to deploy a version of the another component that is currently promoted to the specified environment. In other features, the intermediate format compiler is configured to recognize a path specified in the first set of deployment parameters. The path specifies an ordered list of environments. The intermediate format compiler is configured to traverse each location in the path until a version of the another component promoted to the location is found and cause the deployment module to deploy the version of the another component that is currently promoted to the found location.

In other features, the intermediate objects are applicable to at least two types of environments selected from Pivotal Cloud Foundry (PCF), Kubernetes, Google Cloud Platform (GCP), and Amazon Elastic Compute Cloud (EC2). In other features, the deployment module is configured to deploy the first release object to the first environment using a first deployment method. the deployment module is configured to deploy the first release object to the second environment using a second deployment method. The first parameters select the first deployment method from a list including a kill-run method and a blue-green method. The second parameters select the second deployment method from the list.

Each of the above components of the software deployment system, individually or collectively, may be implemented by a non-transitory computer-readable medium storing processor-executable instructions. Further, each of the above implementations of the software deployment system may be implemented as a computer-controlled process.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings.

In the drawings, reference numbers may be reused to identify similar and/or identical elements.

DETAILED DESCRIPTION

Overview

Figure 1:
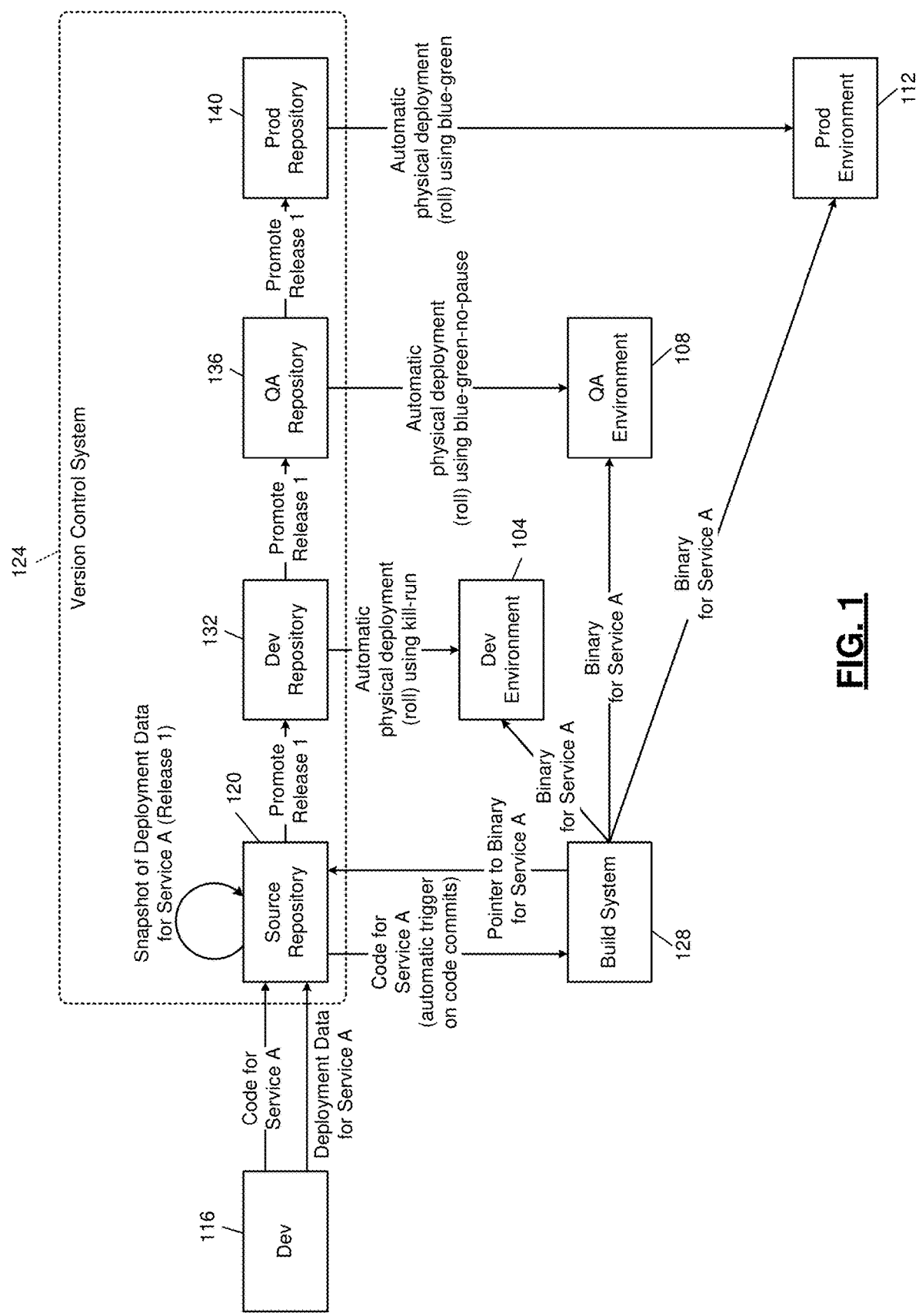
FIG. 1 is a high-level visualization of a software deployment pipeline according to the principles of the present disclosure.

A software delivery pipeline (also known as a software deployment system) according to the principles of the present disclosure may provide a consistent, standardized, enterprise-wide application delivery toolset to enable product delivery teams to manage a deployment pipeline and deliver quality software. The toolset limits the need for each delivery team to develop their own tools and allows them to focus their efforts on business logic. Additionally, the software deployment system allows for regulatory compliance by providing an automated audit trail.

The software deployment system may ensure that proper application configurations are applied to environments as part of a release process. The software deployment system may eliminate the need for development teams to notify operations engineers to update deployment scripts. The software deployment system may allow developers to register version control system branches for deployment to particular development environments. The software deployment system may be used to trigger application releases to simplify existing request processes for release.

The software deployment system may rely on Pivotal Cloud Foundry (PCF) as a multi-cloud platform for application deployment, management, and continuous delivery. The software deployment system allows for self-service application deployments to multiple environments while, in various implementations, avoiding the complexity of tools such as Docker Swarm, OpenShift from Red Hat Software, OpenStack, PCF, Kubernetes, etc. The software deployment system streamlines process complexity normally associated with software deployment by isolating the developer from infrastructure provisioning and knowledge of third-party application dependencies, and explicitly versioning all components at all stages of deployment.

The software deployment system includes a set of software tools, which are available via one or more of a graphical user interface (GUI), a command-line interface (CLI), and an application programming interface (API). The software deployment system enables developers to assemble, compose, and build a system from a set of components. The software deployment system enables a developer to deploy a package to an isolated environment, such as a PCF space. The software deployment system allows the developer to generate human-readable text files in a version control system to describe parameters of their application, application environment, dependencies, and services.

The software deployment system may separate application code and environmental configuration into different repositories to eliminate application rebuilding due to a change in environment configuration. The software deployment system may allow for manual and automated packaging and deployment of an application to multiple virtual environments. The software deployment system may allow a developer to combine multiple applications into a single release to avoid the overhead of deploying applications individually. The software deployment system allows the developer to access a fully functioning and complete application environment that automatically resolves dependencies recursively and simplifies testing.

A software deployment system according to the principles of the present disclosure allows one or more applications (components) to be deployed and promoted to environments together as an atomic unit. An enterprise scheduling system can be leveraged to control for external and business constraints on release timing. The software deployment system automatically resolves dependencies and identifies changes in an app as well as its dependencies, deploying only as needed. This avoids the practice of re-deploying periodically just in case dependencies have changed.

A release history shows what and when any individual components changed and when release as a whole was promoted to which environment. Further, the exact contents of every release are immutably indicated. The software deployment system can deploy into an environments using methods like blue-green and can offer full rollback capabilities. Environments can be tested and certified against a collections of epics and stories. The software deployment system can control deployment targets to ensure data center consistency.

The software deployment system allows expedited releases to be accommodated with a defined out-of-schedule roll. Releases can be as frequent as realistic testing and certification can occur. The software deployment system creates high confidence that what was tested in QA will be the same when going into production.

FIG. 1 illustrates deployment of a service across multiple environments according to the principles of the present disclosure. In this particular example, a development (dev) environment 104, a quality assurance (QA, also referred to as integration) environment 108, and a production (prod) environment 112. A developer 116 (or, more technically, a developer device 116 under the control of a developer) commits code for a service, referred to as Service A, to a source repository 120 within a version control system 124.

In various implementations, the version control system 124 may be a distributed version control system in which multiple copies of the code are maintained in different locations. A master branch may be maintained in a hosted environment, such as GitHub or Bitbucket. While described in this example as a service, Service A could equivalently be a microservice, an application, an application component, etc. Although only one developer is represented in FIG. 1, a team of developers may be responsible for Service A.

The developer 116 also stores deployment data for Service A into the source repository 120. This deployment data is described in more detail below but may take the form of text files, which may adhere to the YAML (YAML Ain't Markup Language) format. The deployment data specifies how an application can be deployed to one or more different types of environments. This deployment data may include dependencies, such as databases on which the service depends, access credentials for such a database, and firewall routes to permit access to the database. In addition, deployment parameters may include environmental variables that may be set, configuration parameters for an environment, such as number of instances, allocated memory, allocated processor threads, etc.

A build system 128 operates on code for Service A from the source repository 120. In various implementations, the build system 128 may incorporate or be based on Jenkins. The build system 128 may be configured such that a build is initiated when code is committed to the source repository 120. The build system 128 may also be configured for periodic or manual builds. When the build system 128 builds an executable form of Service A based on the source code from the source repository 120, the executable form is stored in an artifact repository, such as Artifactory from JFrog Ltd.

The artifact repository may be part of the build system 128, the version control system 124, or may be implemented independently. The artifact repository may store a package, referred to as an artifact or a binary, that may be a file in an archive format (such as zip or tar). Within the archive the format file may be Java bytecode, one or more compiled binary files, and/or executable text, such as JavaScript.

A unique reference to this artifact is generated and provided to the source repository 120. For example, the unique reference may be stored as a text file that is committed to the source repository 120. For example, the unique reference may be stored in a YAML file. The unique reference may take the form of a uniform resource identifier (URI) or a uniform resource locator (URL). The unique reference allows a deployment engine to obtain the artifact for deployment to a particular environment.

Because the unique reference to the artifact is stored in the source repository 120, a snapshot in time of the source repository 120 includes a specific unique reference and therefore indicates a specific artifact. As a result, the artifact to be deployed is specifically identified by the files within the source repository 120.

At a particular stage, the developer 116, or other actor such as an operations engineer, determines that the deployment data, including the latest build, for Service A is ready to be released. At this time, a release object is created. The release object specifies the state of the files in the source repository 120 at the time of the release. The source repository 120 may include a source code section and a deployment section. The pointer to the artifact for Service A is stored within the deployment section. The release object specifically identifies the deployment data stored in the source repository 120, such as based on a timestamp, a set of hashes of the files, and/or by making a copy of the files as they exist at the release time.

For simplicity, an example release will be referred to as Release 1 in FIG. 1. Once a release is created, the release may be promoted for deployment to the dev environment 104. The promotion of Release 1 may be logically performed by copying the files corresponding to the snapshot of Release 1 into a dev repository 132. In various implementations, the files may not physically be duplicated but instead the dev repository 132 may reference the specific versions of the files that existed at the time of Release 1.

When the dev repository 132 includes a new build of Service A, a physical deployment may be performed of the new build into the dev environment 104. For example, a periodic check of the dev repository 132 for new files may identify one or more changed files, which triggers the physical deployment. In other implementations, a change in the dev repository 132 may be pushed to a deployment system to initiate physical deployment. The automatic physical deployment is described in more detail below and may be referred to as a roll. The roll may be configured to deploy the new build using a kill-run method in which the old service is stopped and the new service is subsequently started.

A roll may be configured with a specific release ID, meaning that the specific release ID will be deployed to a physical environment. However, because the release ID changes each time a new release is made, this may require changing the roll specification after every release. To reduce this burden, the roll may instead be defined to operate based on a release tag. Then, any release having this tag is part of the roll. The release tag may be specified in a release.yaml that initiates creation of the release object. Then, the tag may be stored in the release object, and used to trigger the roll.

After unit tests are performed, the developer 116 may promote Release 1 to a QA repository 136. This promotion may be performed manually by the developer 116 or by some other actor, such as an operations engineer. In various implementations, a script or other choreographing tool may initiate the promotion in response to successful deployment and testing of Release 1 within the dev environment 104.

Another automatic physical deployment (roll) may be configured for the QA repository 136. In other words, once the deployment data corresponding to Release 1 is copied into the QA repository 136, this change triggers physical deployment to the QA environment 108. The roll can be configured in many ways, but one option may be to use a blue-green-no-pause method. According to this method, the QA environment 108 may actually include two environments, referred to as blue and green respectively. If the currently operating Service A is within the blue environment (for example, Release 0 of Service A), the new version of Service A (Release 1 of Service A) is initiated in the green environment. Then, as soon as the service is running from the green environment, firewall routes and other connections are immediately switched to the green environment.

Subsequently, the decision is made to promote Release 1 to the prod environment 112. To do this, the developer 116 or another actor instructs the software deployment system to promote Release 1 to a prod repository 140. In the example of FIG. 1, an automatic physical deployment (roll) is configured so that a change in the prod repository 140 causes Release 1 to be spooled up on either the blue or the green instance of the prod environment 112. In this example, a blue-green method is used in which the switch from blue to green (or vice versa) is initiated manually by an operations engineer to minimize the risk of downtime in the event of having to roll back to the previous release.

While not shown in FIG. 1, other services or components may also be promoted across the environments 104, 108, and 112 by the developer 116 and/or other developers. Further, another release of Service A may have been created. It is quite possible that Release 1 is running in the prod environment 112 while another release of Service A is running in the dev environment 104. In fact, yet another release of Service A may be running in the QA environment 108.

Note that one piece of the deployment data that is promoted across repositories 132, 136, and 140 is the pointer to the artifact for Service A. For example only, the artifact may be a binary (which may be stored within an archive file format), a term that is used in FIG. 1 for shorthand. Based on this pointer, the dev environment 104, the QA environment 108, and the prod environment 112 may obtain the binary from the build system 128.

As seen from the simple example in FIG. 1, each environment has a physical environment and logical environment. The physical environment may include hosts, clusters, PCF foundations, domain name system (DNS) settings, load balancing servers, and routing configurations. The logical environment may include components, versions, applications, configurations, datasets, and database schemas.

A release is a collection of a particular logical set and provides a vehicle for an application version to move through various environments into production. A release is immutable (remaining constant from environment to environment) and atomic. Atomic means that the components of the release are all moved into an environment at once and, in the event of a rollback, are all removed. A release may take the form of an object of type "release" in a database of the software deployment system.

A release object represents a specific set of files that describe each component in the release. The specific set of files are fixed in time, such as by recording a commit hash at the time of release creation. The release includes one or more versioned applications, each including an executable form and a configuration (config) version. In various implementations, the config version uniquely specifies the version of the executable form because a link to the executable form is contained within the config data. Each release may be given a name and a version identifier. The release object is assigned a unique identifier and may be labeled with a version number of the application. In various implementations, the release object includes an indicator of who the release requestor was, the time of creation, and to which environments the release has been deployed.

A distributed version control system, such as Bitbucket, is used to manage projects and files as they change over time. It can be seen as a managed inventory that provides versioning and deployment automation. The distributed version control system stores information in a data structure called a repository, which contains a collection of commit objects in the database that maintains versioned files organized in application packages (also referred to as folders). The contents of each folder provides all the necessary metadata for each application.

According to the principles of the present disclosure, a release (application package) is deployed into a particular environment through a particular repository. Developers promote a release package into a repository, as illustrated in FIG. 1, and an automated role may deploy it into the corresponding physical environment. Deployment into the physical environment is performed based on files in the release, which include all the data to deploy the application.

A separate text file (such as a YAML file) is defined for each environment and describes an application and all the configuration information needed to instantiate and run the application in that environment. In various implementations, the distributed version control system stores configuration information (including a pointer to the executable form) separate from source code. In various implementations, the configuration information may be distributed across three types of files, including a service file, an application file, and a route file.

A service file specifies run-time dependencies for a single service/component. Application files pull in multiple services of one or more applications to compose a complete system. For each environment, an application file is created to describe deployment parameters unique to that environment. If the application includes services exposed to other applications, one or more route files can be created to expose hypertext transfer protocol (HTTP) and transmission control protocol (TCP) routes to the service.

Figure 2:
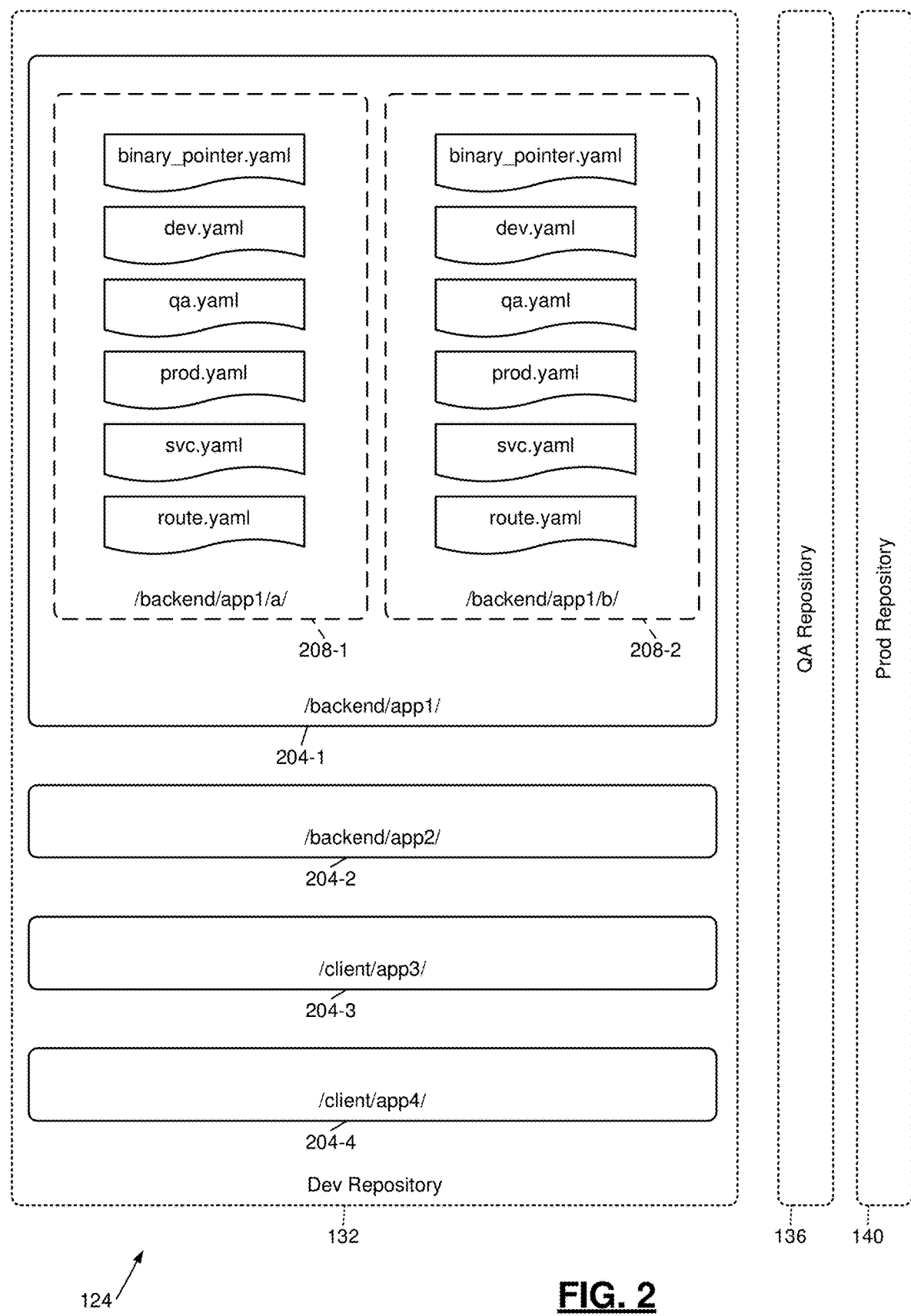
FIG. 2 is a graphical representation of an example version control system architecture according to the principles of the present disclosure.

In FIG. 2, a simplified graphical representation of the dev repository 132 is shown. The representation may be generally applicable to the QA repository 136 and the prod repository 140 as well. The dev repository 132 includes sections (which may be represented in a command-line or graphical user interface as folders) for application 1 204-1, application 2 204-2, application 3 204-3, and application 4 204-4 (collectively, applications 204). The applications 204, which will generally be more creatively named, may be part of the backend systems or client systems, which may lend themselves to organization in higher-level folders, such as "backend" and "client."

In the section for application 1 204-1, components A 208-1 and B 208-2 are shown for illustration. Component A may be the same as Service A of FIG. 1. In other configurations, Service A of FIG. 1 may refer to the applications 204 that, together, provide a particular service. In any case, the release may encompass just component A 208-1, or may encompass both components A and B, or may encompass multiple or even all of the four applications 204.

As an illustration, component A 208-1 is shown to include files representing deployment parameters. A binary_pointer.yaml file includes a unique identifier of the location of the artifact—that is, an executable form of component A. A service file (svc.yaml) stores information about component A that is environment-agnostic. An application file for each environment (dev.yaml, qa.yaml, and prod.yaml) describes the environment-specific deployment parameters for component A. Each of the application files may reference the same service file and, using a templating language, provide values for tokens contained within the service file.

A routing file (route.yaml) includes information about networking routes for component A to access other services, such as a database. The routing file may also include information about networking routes that allow component A to be accessed—for example, component A may be a database that answers queries from other components.

Figure 3A:
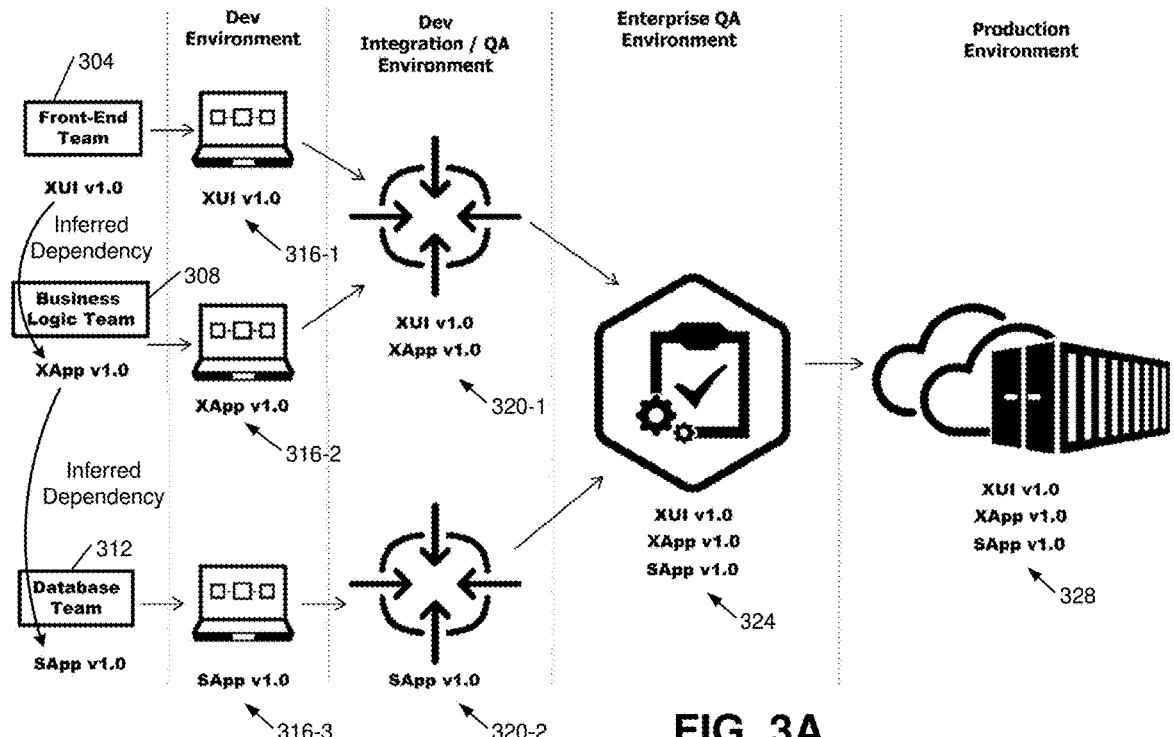
FIGS. 3A, 3B, and 3C are illustrations of integration between multiple teams across multiple environments.

In FIG. 3A, a set of development teams is shown for an example integration illustration. A front-end team 304 is responsible for developing a service referred to as XUI. XUI interfaces with a service named XApp, developed by a business logic team 308, which in turn requires data from a database named SApp, developed by a database team 312.

In FIG. 3A, the front-end team 304 has released version 1.0 of XUI to a dev environment 316-1. The business logic team 308 has released version 1.0 of XApp to a dev environment 316-2. The database team 312 has released version 1.0 of SApp to the dev environment 316-3. The first versions of XUI and XApp have been promoted to an integration environment 320-1. The first version of SApp has been promoted to an integration environment 320-2. The first versions of XUI, XApp, and SApp are combined in an enterprise quality assurance (QA) environment 324. Because these versions interoperate successfully, they have further been promoted to a production environment 328.

Figure 3B:
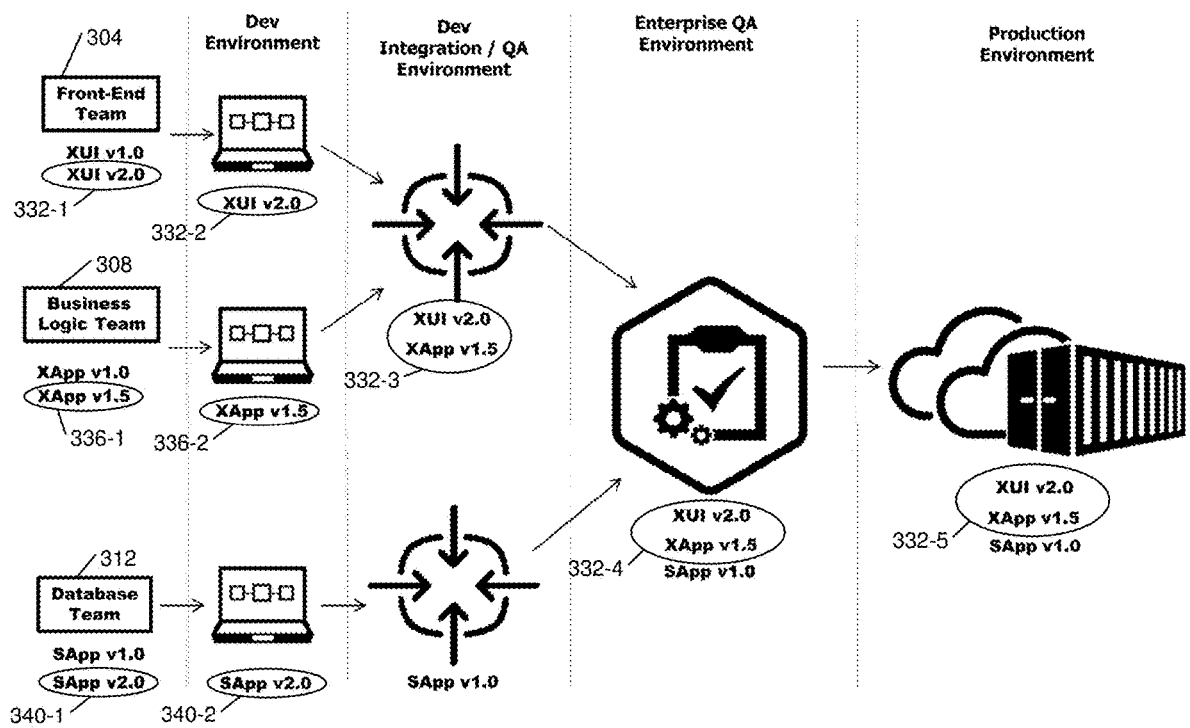

In FIG. 3B, the front-end team 304 has developed a new version of XUI (2.0), indicated at 332-1. The second version has been promoted to the dev environment, as indicated at 332-2. The second version of XUI has in fact been promoted all the way to the integration environment (indicated at 332-3), the enterprise QA environment (indicated at 332-4), and the production environment (indicated at 332-5). Meanwhile, the business logic team 308 has developed a version 1.5 of XApp, indicated at 336-1. The business logic team 308 promoted version 1.5 to their respective dev environment, as illustrated at 336-2. Version 1.5 has been promoted all the way through the integration environment (indicated at 332-3), the QA environment (indicated at 332-4), and the production environment (indicated at 332-5).

Figure 3C:
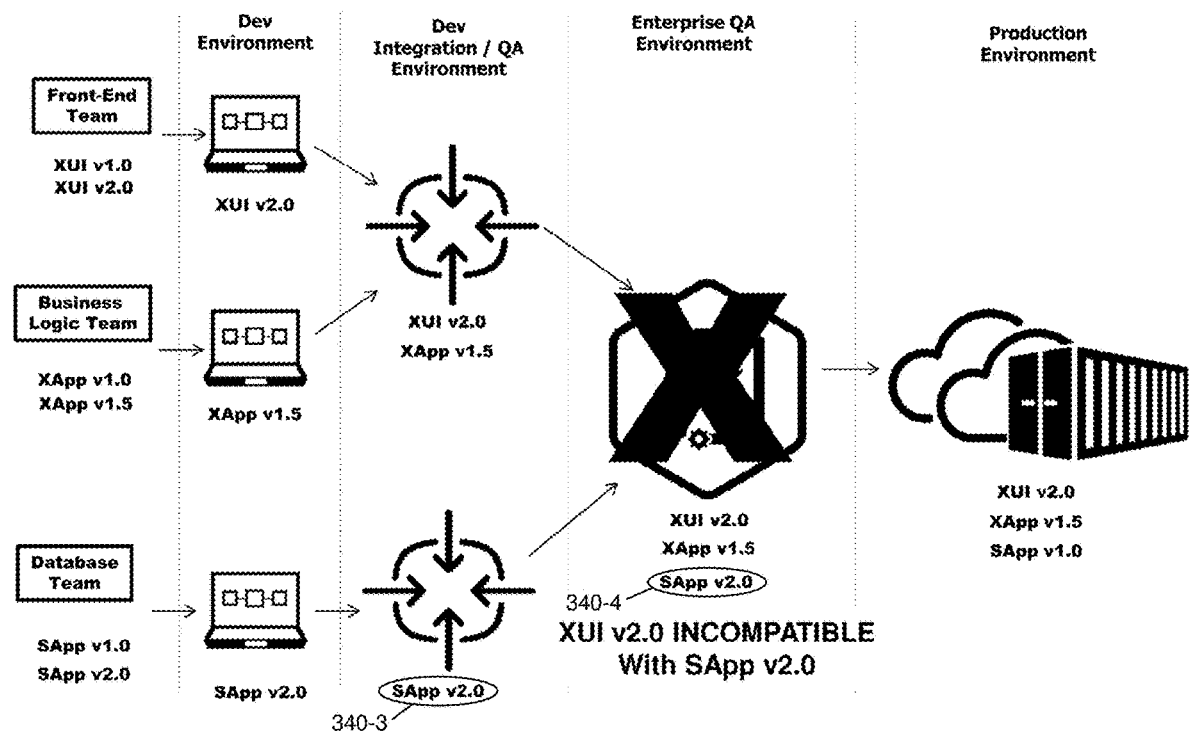

Meanwhile, the database team 312 has developed a second version of SApp, as indicated at 340-1. The second version of SApp has been promoted to their dev environment, as indicated at 340-2. In FIG. 3C, version 2.0 of SApp is promoted to the integration environment for the database team 312, as shown at 340-3. The second version of SApp is then promoted to the enterprise QA environment, as indicated at 340-4. However, in the enterprise QA environment, it is determined that the second version of SApp is not compatible with XUI v2.0 and XApp v1.5. This determination is made fairly late in the process, making it more difficult to make minor changes to either XUI v2.0, XApp v1.5, or SApp v2.0 to resolve the incompatibility.

Figure 4A:
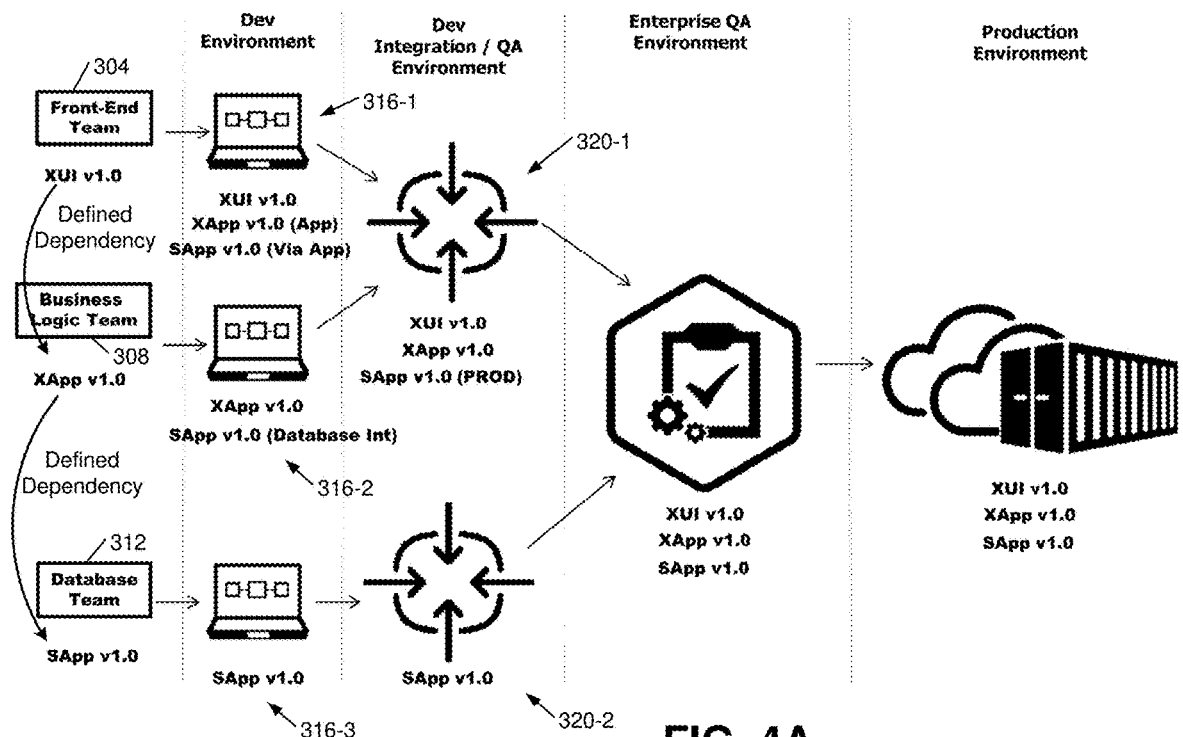
FIGS. 4A and 4B are graphical illustrations of virtual integration testing across teams according to the principles of the present disclosure.

In FIG. 4A, aspects of the software deployment system allow the front-end team 304 to explicitly define dependency of XUI on XApp. In addition, the business logic team 308 can explicitly identify the dependency of XApp on SApp. Further, because the deployment parameters are environment-specific, the front-end team 304 can explicitly define that a dev environment deployment of XUI should be deployed with the version of XApp from the dev environment of the business logic team 308. In various implementations, this may be accomplished by creating a dev.yaml file for XUI (which defines parameters used to deploy XUI to the dev environment) that points to the dev.yaml file in the repository corresponding to the dev environment 316-2 of the business logic team 308.

Further, the business logic team 308 can explicitly define the dependency of XApp onto SApp. For example, the business logic team 308 may indicate that a dev environment deployment of XApp should be performed in coordination with the version of SApp in the integration environment 320-2 (of the database team 312). The business logic team 308 can accomplish this by setting the dev.yaml file for XApp to reference (or depend on) the dev.yaml file from the repository corresponding to the integration environment 320-2 (of the database team 312). Note that while the integration repository is specified, the dev.yaml file is selected: this is because SApp will be deployed to a dev environment (the dev environment 316-2), and so the dev deployment parameters are used. However, because the integration repository is specified, the dev.yaml corresponds to the release of the SApp that is currently deployed to the integration environment 320-2.

In various implementations, the software deployment system may support the concept of a backfill. For example, a backfill of the QA environment would mean that a release of XUI that has been newly promoted into the QA environment is tested with the releases of XApp and SApp that are currently in the production environment. The backfill may also be used in earlier environments, such as the dev environment 316-1. For example, the dev environment 316-1 can be backfilled from the production environment, the QA environment, or even the integration environment to ensure that the releases of other components from those environments are being used.

In various implementations, the business logic team 308 may specify, in the dev.yaml file for XApp, a dependency on the dev.yaml file for SApp. As described above, the business logic team 308 could explicitly specify that the SApp dev.yaml file be found in the repository corresponding to the integration environment 320-2 (of the database team 312). Another option is for the business logic team 308 to configure a path variable. The path variable may specify an ordered series of repositories in which to search for the file. Often, the path variable will start with the prod repository so that the production version of a dependency is used. However, if a team is relying on a new or revised feature, the team may want to adjust the path to search for a file in a leftward repository, such as one of the integration repositories. To depend on whatever SApp release is present in the integration environment of the database team 312, the corresponding repository may be placed into the path variable prior to the production repository. In this way, the dev.yaml for SApp 2.0 will be found rather than the dev.yaml for SApp 1.0, which exists in the production repository.

Figure 4B:
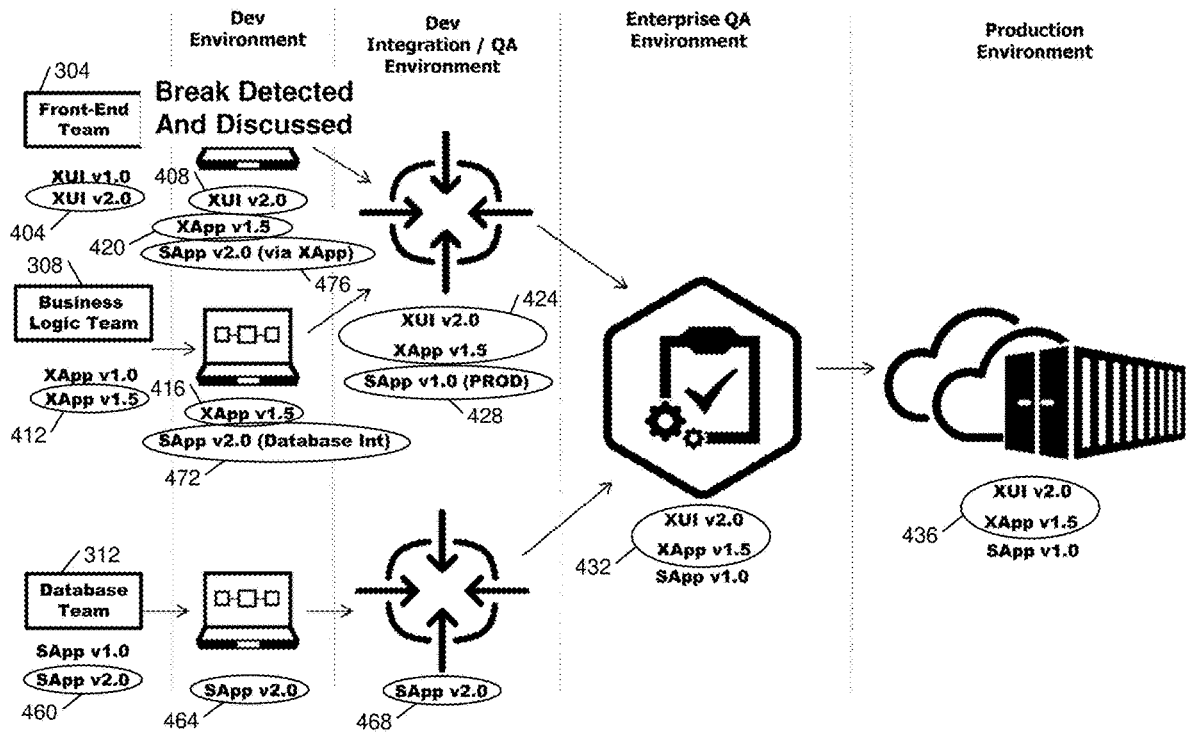

In FIG. 4B, XUI version 2.0 is developed, as indicated at 404. Version 2.0 is deployed to the respective dev environment, as indicated at 408. Then, version 1.5 of XApp is developed, as indicated at 412, and promoted to the respective dev environment, as indicated that 416. Once version 1.5 is promoted to the dev environment, the changed files (including, at least, svc.yaml) results in a roll of version 1.5 to the dev environment of the front-end team 304 as indicated that 420. In this way, the front-end team 304 can evaluate integration of their XUI app with the release of XApp that is currently in the dev environment of the business logic team 308. Together version 2.0 of XUI and version 1.5 of XApp are promoted to the integration environment, as indicated at 424.

Since each app needs to have an application file for each environment, the business logic team 308 creates a dev.yaml file, an integration.yaml file, a qa.yaml file, and a prod.yaml file. Note that these names are simply for illustration. The business logic team 308 may specify in the integration.yaml file that XApp depends on SApp and that the integration.yaml file for SApp should be found in the production repository. Therefore, because SApp version 1.0 is deployed into the production environment, SApp 1.0 will be deployed into the integration environment, as indicated that 428. Version 2.0 of XUI and version 1.5 of XApp are both promoted to the QA environment as indicated at 432 and into the production environment as indicated at 436.

The database team 312 has developed version 2.0 of SApp, as indicated at 460. Version 2.0 is then imported to the dev environment of the database team 312, as indicated at 464. Next, version 2.0 of SApp is promoted to the integration environment of the database team 312, as indicated at 468. Because the dev.yaml file in the integration repo of the database team 312 has changed, version 2.0 of SApp is rolled to the dev environment of business logic team 308, as indicated at 472. Further, because the development deployment of XUI depends on the development deployment of XApp, version 2.0 of SApp is rolled to the dev environment of the front-end team 304, as indicated at 476. At this time, the incompatibility between XUI version 2.0 and SApp version 2.0 is identified and can be addressed before further promotion and testing occurs.

Block Diagrams

Figure 5:
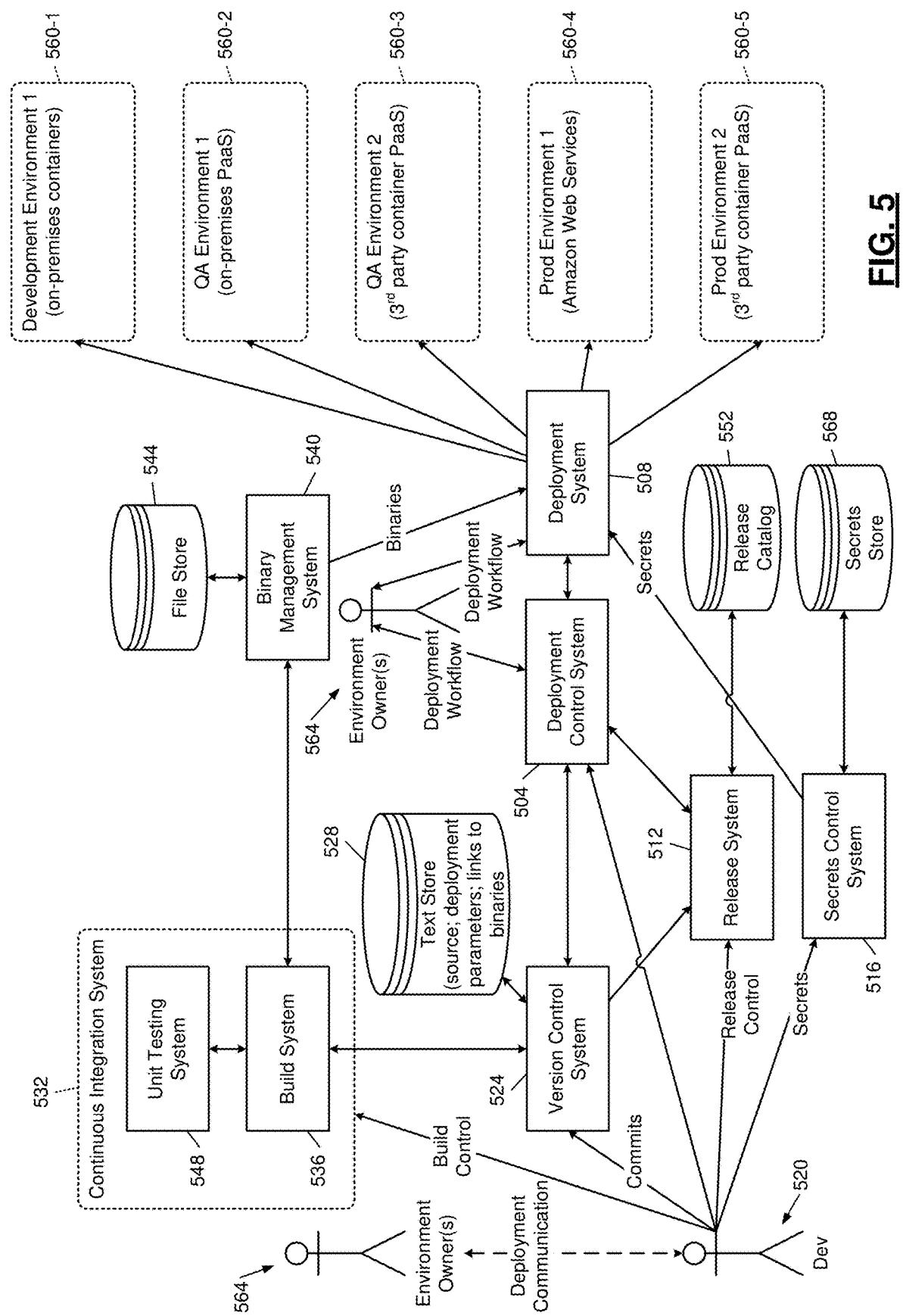
FIG. 5 is a functional block diagram of an example implementation of the present disclosure.

In FIG. 5, a high-level functional block diagram of the software deployment system includes a deployment control system 504, a deployment system 508, a release system 512, and a secrets control system 516. A developer 520 commits source code and configuration parameters to a version control system 524. The version control system 524 may include a database, a graphical front end, and a command-line interface, and may store text files in the text store 528. For example, the text files may include source files, deployment parameter files, and links to executable forms of applications (referred to in shorthand as binaries).

The developer 520 controls a continuous integration system 532 and may specify that the continuous integration system 532 automatically builds a package whenever commits are made to the version control system 524. In various implementations, the developer 520 may maintain a copy of the version control system 524 on a local device (not shown) and may commit changes to the version control system 524 after performing local testing.

The continuous integration system 532 may include a build system 536, such as Jenkins. In response to a source code commit to the version control system 524, the build system 536 may commence a new build of the package and store the resulting build package into a binary management system 540. The binary management system 540 may be known more generally as an artifact repository. The term artifact is used because an artifact may not necessarily be a compiled binary file, but may also include Java bytecode, executable text (such as JavaScript), and other executable forms. The binary management system 540 may maintain the artifacts in a file store 544.

The continuous integration system 532 may include a unit testing system 548 that performs unit tests on each new build package. Once a build passes unit tests, the build system may automatically store a link to the new build into the version control system 524. This link uniquely identifies a build so that the build can be retrieved from the binary management system 540.

The developer 520 controls the release system 512 to generate a new release based on revised source code in the version control system 524. In various implementations, the developer 520 may configure the release system 512 so that, on a periodic basis (such as every night or every Sunday), the release system 512 generates a new release if changes have been made in the version control system 524.

In order to create a release, the release system 512 creates a release object in a release catalog 552, which may take the form of a NoSQL database. The release object identifies the specific versions of implement parameters within the version control system 524, including a link to the binary/artifact. The release object includes an identifier so that that specific release can be promoted to one or more environments.

In the example of FIG. 5, a development environment 560-1, a first QA environment 560-2, a second QA environment 560-3, a first production environment 560-4, and a second production environment 560-5 (collectively, environments 560) are shown. Under the control of the developer 520, and/or an environment owner 564, the deployment control system 504 can promote releases to one or more of the environments 560.

For example only, the deployment control system 504 may promote a release to a particular environment by storing that release in a corresponding repository of the version control system 524. The deployment system 508 monitors the version control system 524 and, in response to an update to the corresponding repository, may automatically physically deploy the new release to a respective one of the environments 560. As part of physical deployment, the corresponding binary is obtained from binary management system 540 according to the link specified as one of the deployment parameters.

The developer 520 may provide secrets to the secrets control system 516, which are stored in an encrypted form in a secrets store 568. Secrets that an application needs to rely on our specified by name as deployment parameters so that the deployment system 508, when deploying those applications, can obtain those secrets from the secrets control system 516 and place them into the respective environment. For example, the secrets may be passed to an application as environment parameters. In other implementations, the deployment system 508 may provide a token to the application so the application can request secrets from the secrets control system 516 during operation and/or upon startup.

Figure 6:
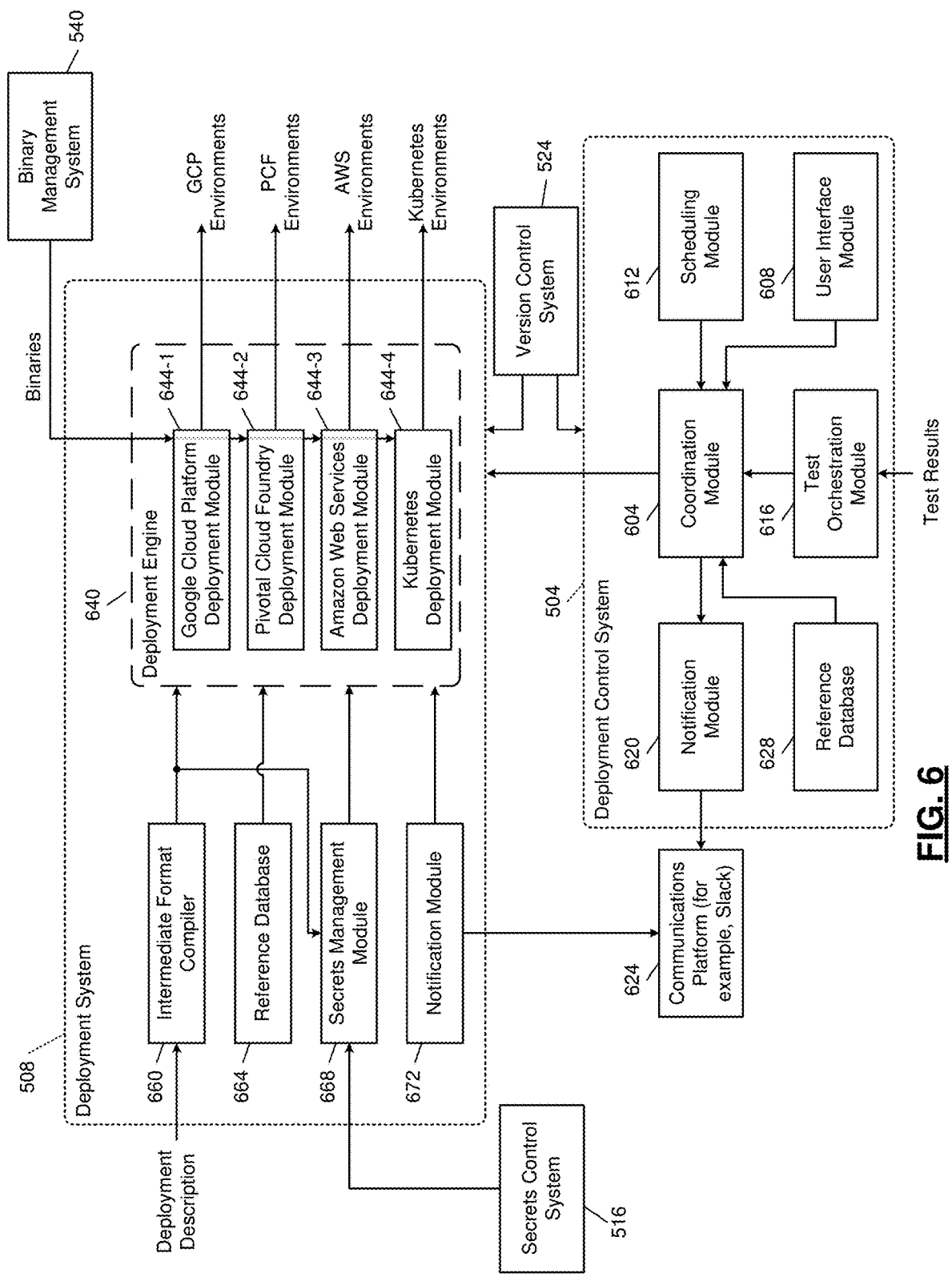
FIG. 6 is a functional block diagram of the deployment system and the deployment control system of FIG. 5.

In FIG. 6, a functional block diagram of an example implementation of the deployment control system 504 includes a coordination module 604, which defines and sequences deployment steps, approval gates, etc. A user interface module 608, which may include a graphical user interface (GUI) and/or a command-line interface (CLI), allows developers and other users, such as environment owners, to control the deployment control system 504.

Through the user interface module 608, a user can control manual release promotion as well as orchestrated release promotion and scheduled release promotion. Each system of FIG. 5 may include a respective user interface module. In other implementations, the user interface module 608 may allow user control of the deployment control system 504, the deployment system 508, the secrets control system 516, and the release system 512. The user interface module 608 may implement a web interface in addition to a command-line interface, and separate web interfaces may be hosted for each of the systems of FIG. 5. In various implementations, one or more systems such as the build system 536, the binary management system 540, and the version control system 524 are obtained from a third party and include their own user interface (graphical, command-line, web, etc.).

For example, a scheduling module 612 may schedule promotions to various environments. For example, a promotion to the production environment may be scheduled for off-peak times of day. Meanwhile, the scheduling module 612 may cause promotion to development environments multiple times per day during the work week.

A test orchestration module 616 may receive results of user testing and user acceptance testing (UAT) and control promotion of releases according to when tests are passed. In various implementations, when a promotion is initiated by the scheduling module 612, the promotion will only proceed when positive test results have been received by the test orchestration module 616.

A notification module 620 communicates with a communications platform 624, which may include email, a web portal, and/or the Slack messaging system. Although the arrow from the notification module 620 to the communications platform 624 is shown as unidirectional, the communications platform 624 may allow queries, such as via the Slack messaging system, to obtain status information via the notification module 620.

A reference database 628 in the deployment control system 504 stores a list of approvers for promotions, credentials for environments, test definitions, etc. The coordination module 604 communicates with the version control system 524 and may promote releases to environments by copying the deployment files to the repository corresponding to those environments.

In various implementations, the coordination module 604 may also notify the deployment system 508 when a promotion has been performed, which may trigger a roll. In other implementations, the deployment system 508 monitors the version control system 524 to identify when files in repositories for which the deployment system 508 is responsible have been modified, at which time a roll may be triggered depending on the roll tags in the releases where changes are identified.

In FIG. 6, a functional block diagram of an example implementation of the deployment system 508 includes a deployment engine 640 and physically instantiates and spools up environments in one or more type of environment. As an example only, the deployment engine 640 is shown with a Google Cloud Platform (GCP) deployment module 644-1, a Pivotal Cloud Foundry (PCF) deployment module 644-2, an Amazon Web Services (AWS) deployment module 644-3, and a Kubernetes deployment module 644-4 (collectively, deployment modules 644).

The deployment modules 644 obtain binaries from the binary management system 540 of FIG. 5 according to links contained in deployment parameters. These deployment parameters are received from an intermediate format compiler 660, which receives a collection of descriptor files, each in a well-known format such as JSON (JavaScript Object Notation), YAML, etc. The objects in these descriptor files follow a domain specific language (DSL) defined for the software deployment system.

The DSL enables developers to express composition of services, dependencies, and deployment parameters for each component of their application. The DSL may also use templating to account for various environment types as well as for deployment parameters that vary across environments. In various implementations, the DSL specifies an inheritance capability to allow one file to reference one or more others. When a first file inherits from a second file, templating may allow the second file to set the values of one or more tokens used by the first file or vice versa. In one example, the second file may include a parameter regarding the number of instances of an application for load balancing purposes and set the parameter equal to INSTANCE_TOKEN. The first file may correspond to deployment in a development environment and specify a value of 1 for INSTANCE_TOKEN. Meanwhile, a third file may inherit from the same second file; the third file may correspond to deployment in a production environment and specify a value of 4 for INSTANCE_TOKEN.

The intermediate format compiler 660 traverses the deployment parameters to identify dependencies and to develop a dependency graph to determine which components (and which releases of those components) to be deployed. The intermediate format compiler 660 compiles its inputs into a list of service objects, where each service object describes one deployable. The list of service objects is called an intermediate format.

The deployable units generated by the intermediate format compiler 660 can also be referred to as services or components. For each component, the intermediate format object may include information about how the component is packaged, including a link to a binary artifact together with, for example, a buildpack specification for PCF deployment or a docker file for deployment into Kubernetes. The intermediate format objects also encode network ingress and egress for each component. For example, if component A is connected to component B, an encoding for a.egress=b.ingress may be included.

The intermediate format objects store information about storage that is needed by the application so that the deployment engine 640 can mount the storage into the application container. The intermediate format object stores information about which secrets are needed by the component. The intermediate format object stores information about number of instances of the component needed for the application for purposes such as load balancing. The intermediate format object may also store information about any PCF services needed so that the deployment engine 640 can either create platform-brokered services or bind to a user-provided service in PCF.

The deployment module 644 translates service objects in the intermediate format to implementation-specific setup routines for HTTP routes, deployable creation (such as Buildpack for PCF and Docker containers for Kubernetes), creating storage volumes (or claims on them), performing DNS registration, injecting secrets using implementation-specific facilities, etc. The deployment modules 644 create application containers, configured ingress and egress, map necessary storage into the container, inject secrets, deploy associated pod containers, etc.

A reference database 664 stores details (such as IP addresses and fully qualified domain names) for infrastructure-as-a-service (IAAS) and platform-as-a-service (PAS), login credentials, etc. for use by the deployment engine 640. A secrets management module 668 obtains secrets from the secrets control system 516 according to deployment parameters from the intermediate format compiler 660. The secrets management module 668 provides the secrets to one or more of the deployment module 644 to provide to the app being created in the environment.

A notification module 672 provides notifications to the communications platform 624 (or, in other locations, a separate communications platform than the one used by the control system 504) to identify when physical deployments (also known as rolls) are performed. In addition, the notification module 672 may monitor the version control system 524 to identify changes to repositories corresponding to the environments controlled by the deployment engine 640. Whether performed by the notification module 672 or another module, the deployment system 508 may identify any differences between a desired state in each environment and the observable state, and perform deployments to resolve the differences.

Message Sequence Charts

Figure 7:
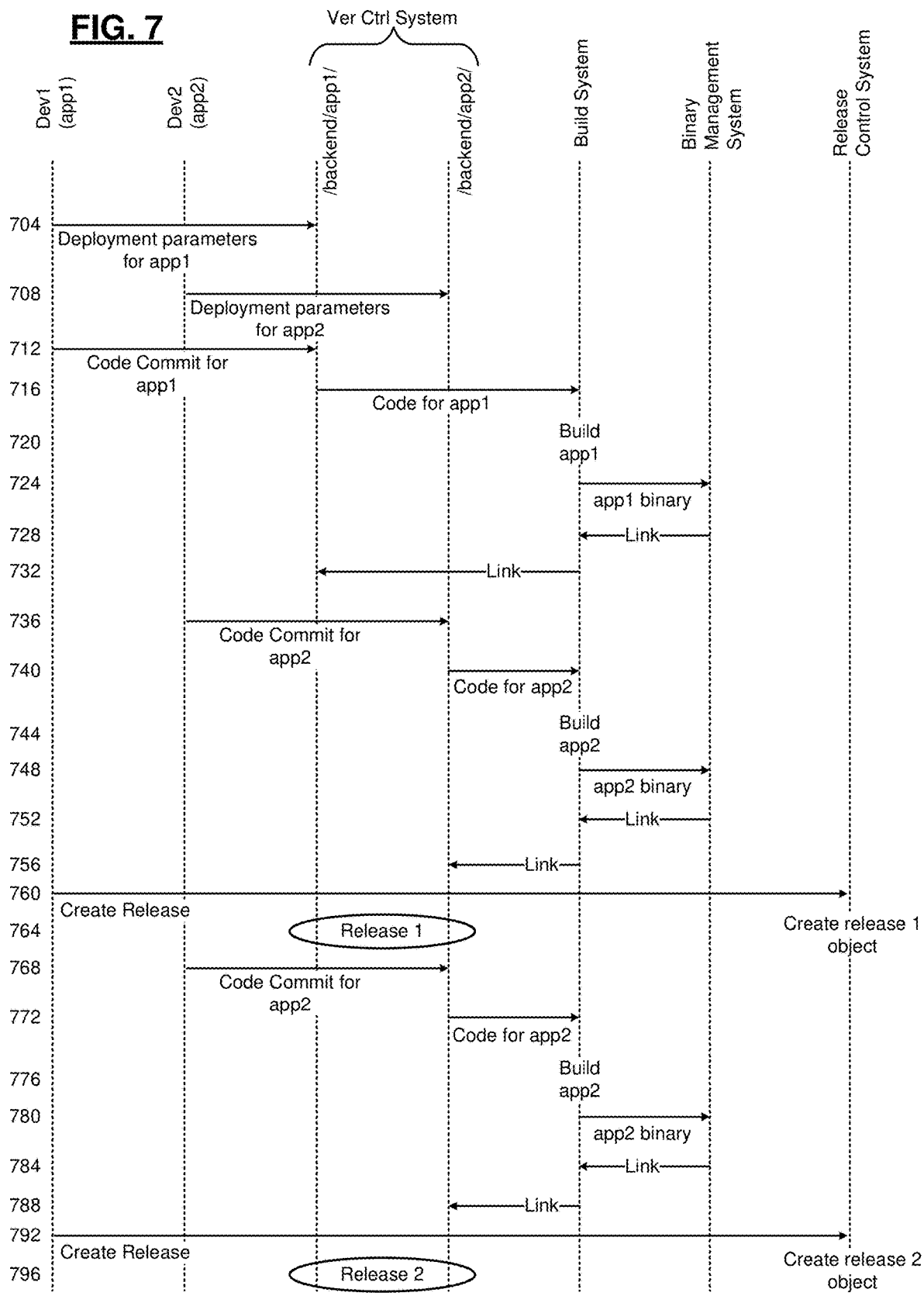
FIG. 7 is a message sequence chart of an example continuous integration and release process.

In FIG. 7, three application builds and two release creations are demonstrated. Two developers of respective applications store code and deployment parameters in respective repositories of a version control system. The first developer stores deployment parameters for the first app into the version control system at 704. Similarly, at 708 the second developer stores parameters for the second application to the version control system—this time, the folder corresponding to the second application.

At 712, the first developer makes a code commit to the source code for the first application. This triggers the build system to pull that code for the first application at 716, build the first application at 720, and store the built binary for application 1 into the binary management system at 724. The binary management system returns a link at 728 to the build system. The build system stores a file containing link into the version control system at 732. This file with link is part of the deployment parameters for the first application.

At 736, the second developer commits code for the second application. Although the code commits for the first and second application are shown sequentially, this is simply for convenience of illustration; there is no requirement that the developers coordinate their work. The code commits for the second application causes the code to be provided to the build system at 740.

At 740, the code for the second application is obtained by the build system, which then builds the second application at 744. The binary (or, as described above, another form of artifact) is stored in the binary management system at 748, which responds with a link to the stored binary at 752. At 756, the build system stores a file including the link into the version control system in the folder corresponding to the second application.

At 760, a responsible user, such as the first developer, creates a release by sending a command to the release control system. At 764, an object for release 1 is created and indicates that the versions of files within the version control system at this time constitute release 1. At some later time 768 the second developer commits code changes for the second application. The build system acquires the code at 772 and build the app at 776. The new binary is stored into the binary management system at 780, which responds with a link to the binary at 784. This link is then stored into the version control system by the build system at 788. At 792, the first developer causes another release to be created (referred to as release 2). As indicated graphically, the release 2 object at 796 indicates that the versions of the files in the version control system at 796 constitute release 2.

Figure 8:
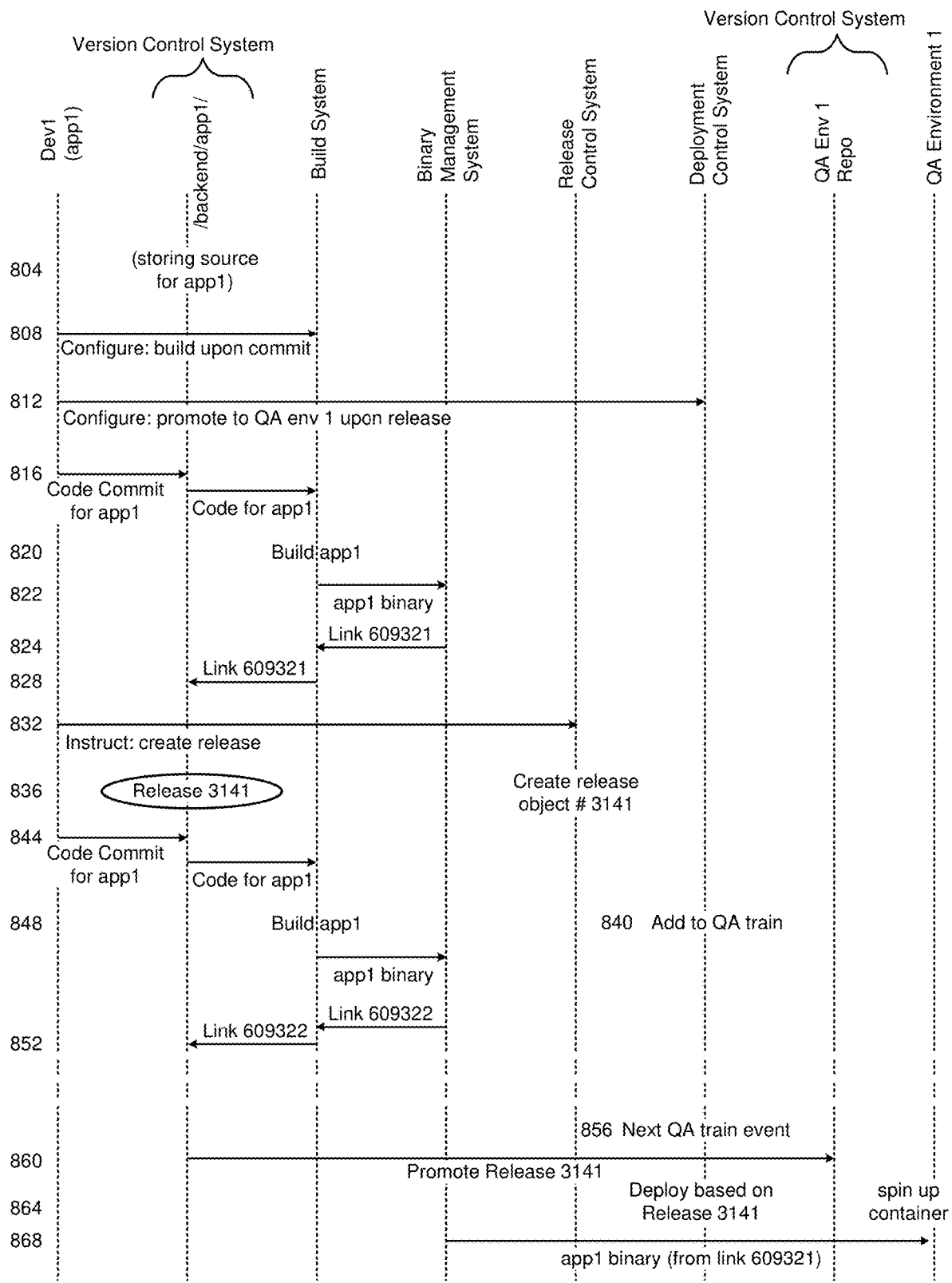
FIG. 8 is a message sequence chart of an example deployment process.

In FIG. 8, an example deployment of a single application is illustrated. At 804, the version control system is presently storing source code for the first application. This may be provided in the past by the first developer. At 808, the developer configures the build system to build the first application upon a code commit. At 812, the developer may configure a deployment control system to promote the release to a first QA environment once the release is created. In addition, although not shown, the developer may configure the deployment system to roll a release promoted first QA environment to the physical first QA environment.

At 816, a code commit for the first application triggers the build system to build the first application at 820. The newly built application is stored in the binary management system at 822, which at 824 returns a link (referred to by integer 609321) to the artifact. This link is stored into the version control system by the build system at 828.

At 832, the developer instructs creation of a release. At 836, the versions of the files of the version control system within the app 1 directory are stored in newly as a release object (labeled simply for illustration as release 3141). Release 3141 may be added to a QA train at 840 based on the configuration performed at 812. A release train refers to scheduled promotions to various environments. Assuming that a component passes tests (individually and in integration with other components) at each stage, the component may be part of a release train starting in the development environment, moving to a QA environment, and eventually ending up in production.

For illustration, the developer makes another code commit at 844, which leads to the build system at 848 building a new version of the first application and storing a link (referred to by ID 609322) at 852. At some later time 856, the next QA train event occurs. For example, this might be the following morning at 0300 (3:00 AM) Pacific Standard Time. Because release 3141 is in the QA train, release 3141 is promoted by copying the versions of the files referenced by release 3141 to the QA repo in the version control system. This occurs at 860.

Then, if a roll (physical deployment) has been configured with a tag that is associated with release 3141, the release promotion to the QA repo causes the deployment of release 3141 to the QA environment at 864. For example, a container in the QA environment may be spun up. Then, at 868, the app 1 binary pointed to by link 609321 is loaded into the container. Note that link 609321 is used, even though link 609322 is more recent. This is because release 3141 immutably refers to the versions of the files at 836, regardless of how they may change later (such as at 852).

Figure 9:
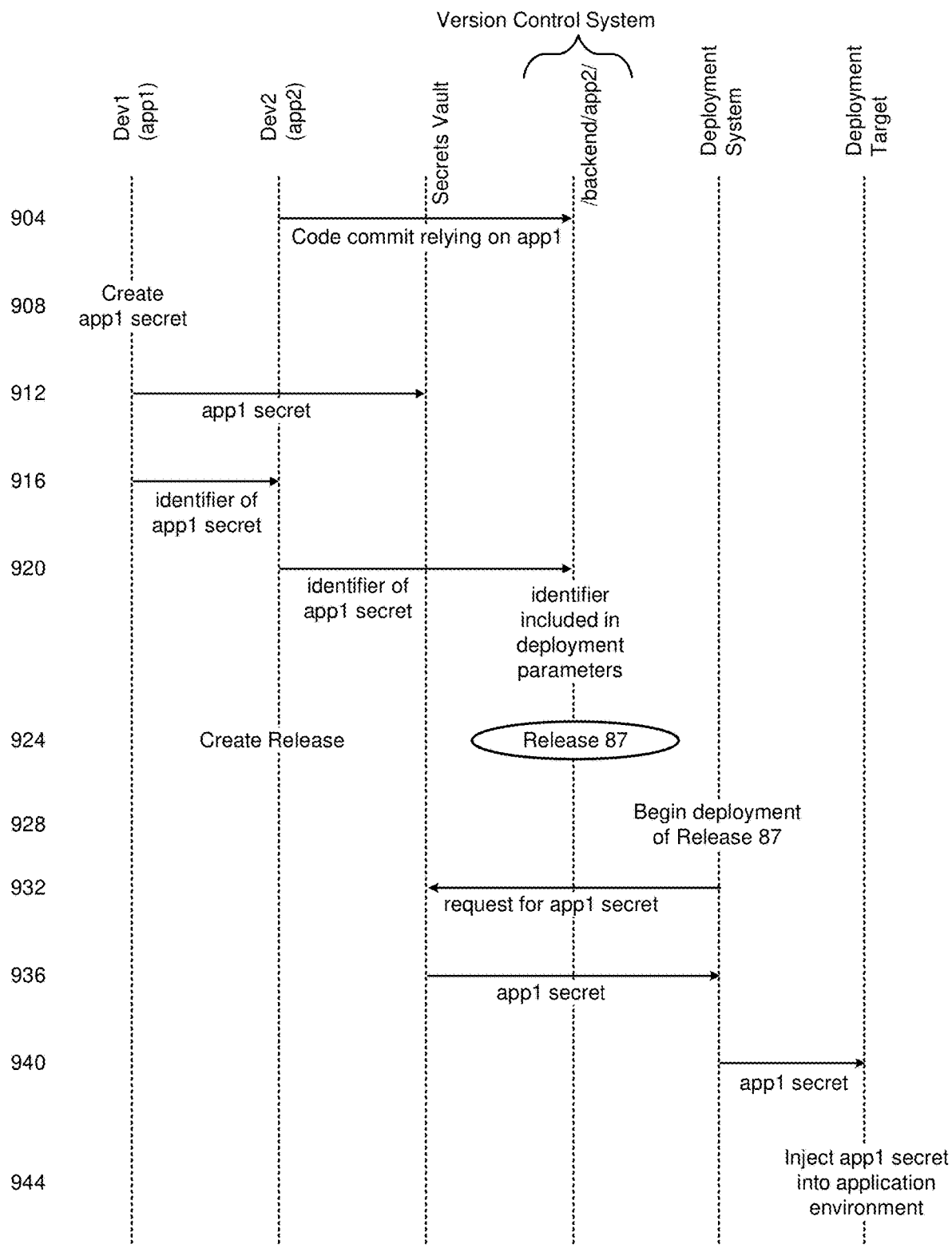
FIG. 9 is a message sequence chart of an example deployment of an application including provision of secrets to the application.

In FIG. 9, an example of creation of a secret by one developer for use by a second developer's deployment is demonstrated. At 904, a developer of a second app commits code to a version control system for the second app that includes a dependency on a first app. For example, the first app may be a database that responds to queries from the second app. In order to query the database, the second app may need access credentials, such as a username and password.

At 908, the first developer creates a secret for app 1. For example, the secret may be an access password for app 1. At 912, the first developer stores this created secret into a secrets vault. For example only, the secrets vault may be implemented by the secrets control system 516 and the secrets store 568 of FIG. 5.

At 916, the first developer provides an identifier of the app one secret to the second level. For example, this identifier may be a name. In various implementations, the name may have human-readable components such as the name of the first application, the fact that it is an access credential, and the fact that it was produced for app 2. At 920, the second developer stores the identifier of the secret into the deployment parameters of the second app in the version control system. At some later time 924, the second developer creates a release. This release is referred to by an integer 87 simply for illustration.

Then, at 928, a deployment begins of release 87. For example, this may follow the promotion of release 87 to a repository of a particular environment. At 932, the deployment system sends a request to the secrets vault for the secret specified by the identifier. At 936, the secrets vault provides the secret to the deployment system. At 940, the deployment system provides the secret to the deployment target. At 944, the secret is injected into the application environment of the deployment target, such as through an environment variable.

In this way, if the first developer needs to update the secret, the release does not need to be re-created and the second developer does not need to know what the secret is. Instead, each time they release is deployed, the release will get the latest version of that state.

Flowcharts

Figure 10:
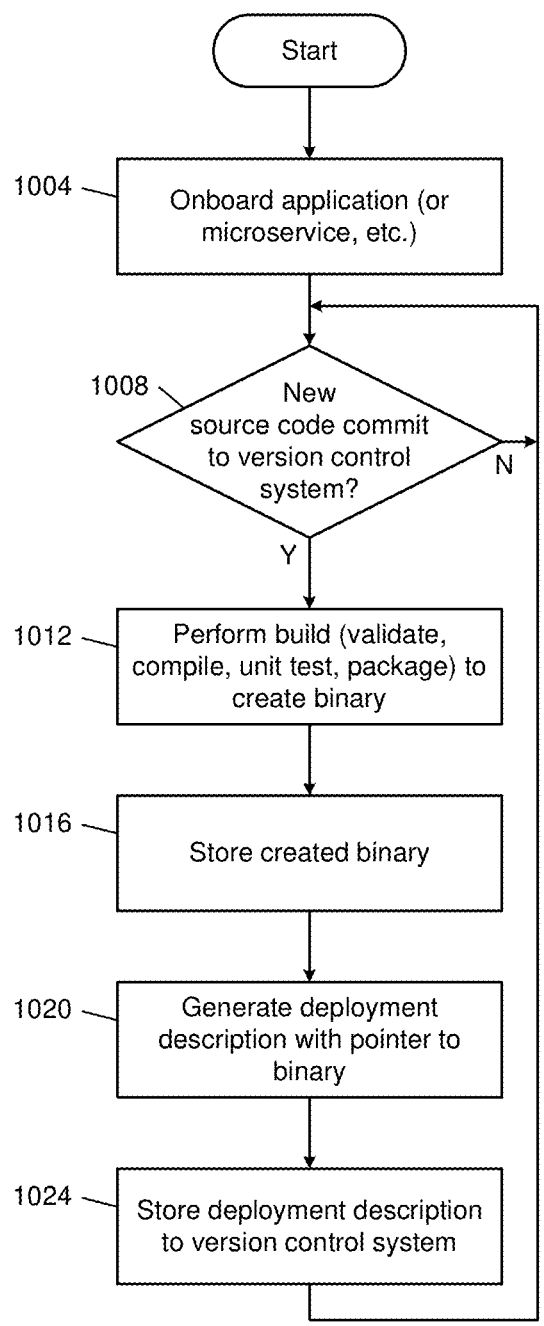
FIG. 10 is a flowchart of a simplified build process.

FIG. 10 is a simplified flowchart of build operation for an application in the software deployment system is presented. This flowchart may reflect some of the actions illustrated in FIG. 7. At 1004, an application (or micro service, application component, etc.) is onboarded to the software deployment system. Onboarding includes storing deployment parameters to allow for deployment to various environments. As seen in more detail in FIG. 12, onboarding may also include configuring a build system to automatically store links to new artifacts into a version control system as part of the application's deployment parameters.

At 1008, control determines whether new source code has been committed to the version control system. If so, control transfers to 1012; otherwise, control remains at 1008. At 1012, in response to the new source code be committed, control initiates a build. This build may include validation, compiling, unit testing, and packaging. The resulting executable form is referred to as a binary, but may take on another form, such as a text file or set of text files. At 1016, control stores the created binary, such as into a binary management system or artifact repository. At 1020, control generates a deployment description file (which may be named buildinfo.yaml) with a pointer to the binary. At 1024, control stores the deployment description file to the version control system.

Figure 11:
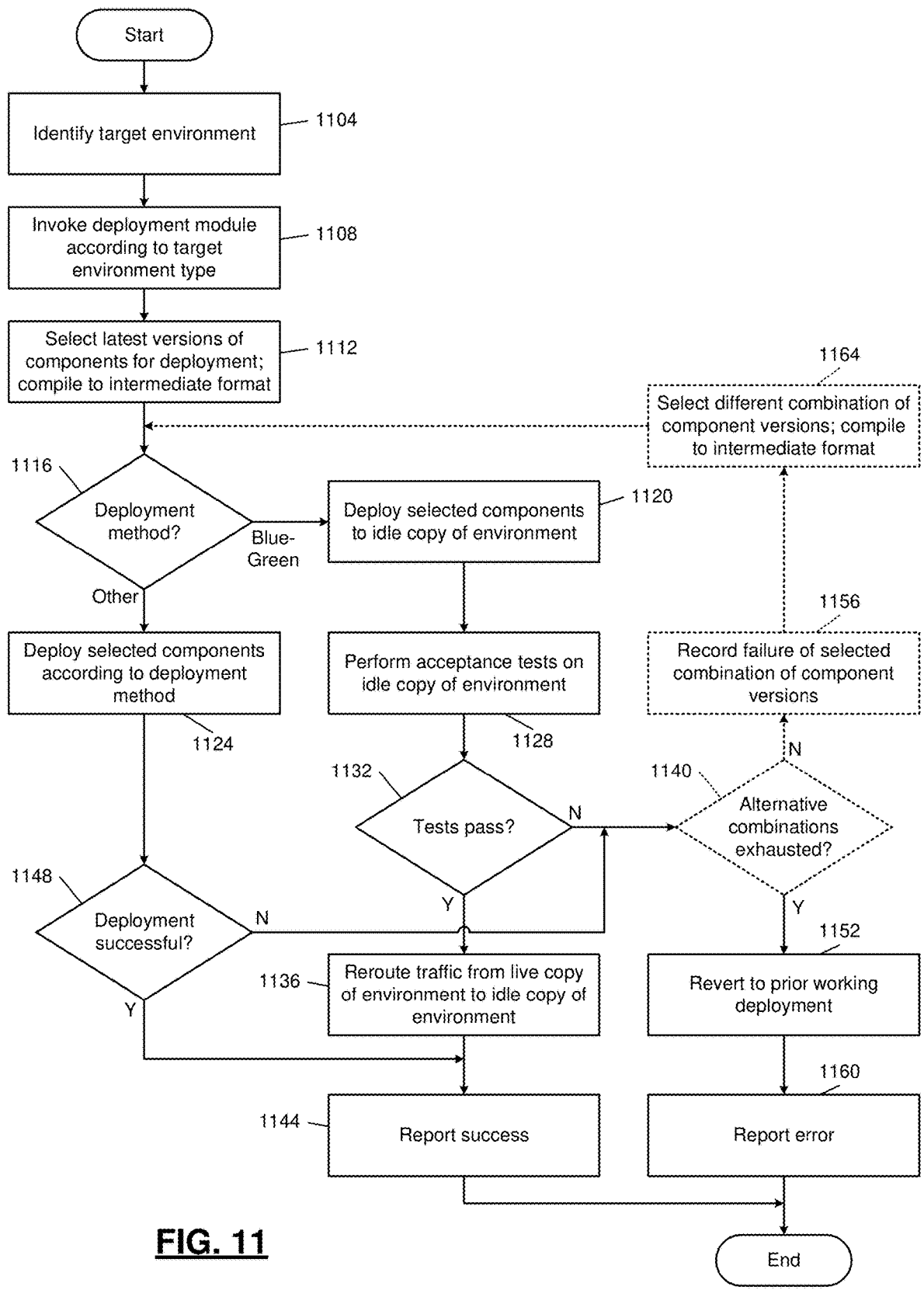
FIG. 11 is a flowchart of an example deployment orchestration process.

FIG. 11 demonstrates a simplified deployment process. Control may begin in response to new files appearing in a repository corresponding to an environment. Control begins at 1104, where the target environment corresponding to the repository with changed files is identified—that is, the environment corresponding to the repository in which the modified files are found. At 1108, the deployment module corresponding to the target environment type is invoked for example, if the target environment type is PCF, then the PCF deployment module is invoked.

At 1112, control selects the most recent releases promoted to the repository and whose roll tags match the defined roll. Control then compiles deployment parameters for these releases to an intermediate format. At 1116, control determines what the deployment method is. If the deployment method is blue-green, control transfers to 1120; otherwise, control transfers to 1124. At 1120, control deploys selected components to an idle copy of the target environment. At 1128, control performs acceptance testing on the idle copy of the environment. At 1132, if the tests pass, control transfers to 1136; otherwise, control transfers to 1140.

At 1136, control reroutes traffic from the live copy of the environment to the idle copy of the environment. In various implementations, control may wait before executing 1136 until an operations engineer has approved the deployment. In various implementations, a script under the control of the operations engineer may initiate the live-idle switch. In other configurations, such as blue-green-no-pause, there is no delay before traffic is rerouted. In fact, in some configurations, tests are not even performed before traffic is rerouted.

Control continues at 1144, where success is reported and control ends. Returning to 1124, a deployment method other than blue-green is specified and therefore the selected releases are deployed according to the specified deployment method. Control continues at 1148, where control determines whether the deployment is successful, such as based on unit tests. If so, control transfers to 1144; otherwise, control transfers to 1152.

In some implementations, a choreography layer, which may be separate from the software deployment system, may attempt to combine available releases in different ways to arrive at a working system. In such implementations, instead of transferring to 152 from 1132, control instead transfers to 1140. At 1140, control determines whether there are alternative combinations of components for deployment. If the potential alternative combinations have been exhausted, control transfers to 1152; otherwise, control transfers to 1156. At 1156, control records the failure of the selected combination of component versions and transfers to 1164. At 1164, control selects different combinations of the component versions to attempt to identify combinations that will interoperate. Control then returns to 1116.

At 1152, control reverts to the prior working deployment and transfers to 1160. At 1160, control reports an error and ends.

Figure 12:
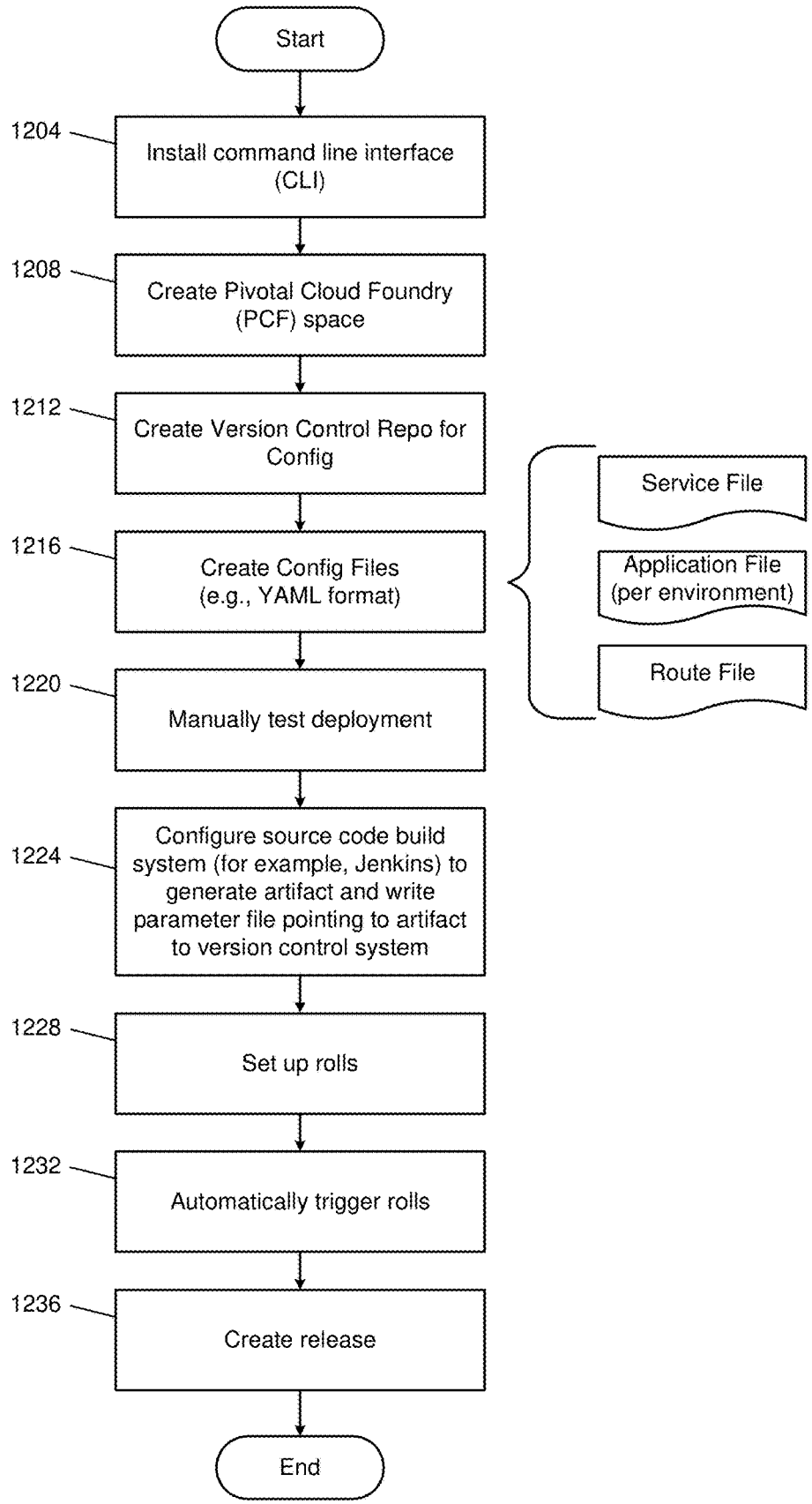
FIG. 12 is a high-level flowchart of a process for onboarding an application to the software deployment system of the present disclosure.

In FIG. 12, a high-level overview of onboarding of a new application is illustrated. At 1204, a developer installs a command-line interface (CLI) to allow interaction with the software deployment system. At 1208, the developer creates a space into which into which the deployment control system can deploy the app. For example, the space may be a pivotal cloud foundry (PCF) space. At 1212, control creates a repository in a version control system for the configuration of the application deployment—that is, for config files encoding the deployment parameters. At 1216, control creates config files, such as in the YAML format.

As illustrated in FIG. 12, these config files may include, as described above, the service file, an application file per environment, and a route file. In various implementations, multiple route files can be defined, one for each potential route. In other implementations, there is a single route file, but that single route file can reference and incorporate other files.

At 1220, the deployment is manually tested. At 1224, the developer configures a source code build system (for example, Jenkins) to generate an artifact and write a parameter file pointing to the artifact to the version control system. For example, this may be accomplished in a Jenkins environment by creating pack and deploy statements in an integration control file. This causes new builds of the app to prompt creation of a file pointing to the artifact of the new build for storage with the config files.

At 1228, the developer configures rolls to automatically deploy releases to environments that have been promoted to respective repositories. At 1232, control allows the developer to automatically trigger rolls. At 1236, the developer is able to create the first release. This release may then be promoted into a first environment, such as a dev environment. A release train may be set up so that the developer or an operations engineer can then promote the release into a QA environment and then into a production environment. Control then ends.

CONCLUSION

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A. The term subset does not necessarily require a proper subset. In other words, a first subset of a first set may be coextensive with (equal to) the first set.

In this application, including the definitions below, the term "module" or the term "controller" may be replaced with the term "circuit." The term "module" may refer to, be part of, or include processor hardware (shared, dedicated, or group) that executes code and memory hardware (shared, dedicated, or group) that stores code executed by the processor hardware.

The module may include one or more interface circuits. In some examples, the interface circuit(s) may implement wired or wireless interfaces that connect to a local area network (LAN) or a wireless personal area network (WPAN). Examples of a LAN are Institute of Electrical and Electronics Engineers (IEEE) Standard 802.11-2016 (also known as the WWI wireless networking standard) and IEEE Standard 802.3-2015 (also known as the ETHERNET wired networking standard). Examples of a WPAN are IEEE Standard 802.15.4 (including the ZIGBEE standard from the ZigBee Alliance) and, from the Bluetooth Special Interest Group (SIG), the BLUETOOTH wireless networking standard (including Core Specification versions 3.0, 4.0, 4.1, 4.2, 5.0, and 5.1 from the Bluetooth SIG).

The module may communicate with other modules using the interface circuit(s). Although the module may be depicted in the present disclosure as logically communicating directly with other modules, in various implementations the module may actually communicate via a communications system. The communications system includes physical and/or virtual networking equipment such as hubs, switches, routers, and gateways. In some implementations, the communications system connects to or traverses a wide area network (WAN) such as the Internet. For example, the communications system may include multiple LANs connected to each other over the Internet or point-to-point leased lines using technologies including Multiprotocol Label Switching (MPLS) and virtual private networks (VPNs).

In various implementations, the functionality of the module may be distributed among multiple modules that are connected via the communications system. For example, multiple modules may implement the same functionality distributed by a load balancing system. In a further example, the functionality of the module may be split between a server (also known as remote, or cloud) module and a client (or, user) module.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of a non-transitory computer-readable medium are nonvolatile memory devices (such as a flash memory device, an erasable programmable read-only memory device, or a mask read-only memory device), volatile memory devices (such as a static random access memory device or a dynamic random access memory device), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, JavaScript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A software deployment system comprising:
a storage module configured to:
store a plurality of sets of deployment parameters for a plurality of applications, including a first set of deployment parameters for a first application and
receive a pointer to an executable form of the first application and store the pointer as part of the first set of deployment parameters,
wherein the first set of deployment parameters includes parameters specifying deployment of the first application to a first environment of a plurality of environments;
a release module configured to generate release objects that each identifies a specific version of one of the plurality of sets of deployment parameters;
a deployment control module configured to assign the release objects to the plurality of environments; and
a deployment module configured to deploy the release objects to the assigned environments according to the sets of deployment parameters identified by the release objects, wherein:
a first release object corresponds to the first application and identifies a specified version of the first set of deployment parameters and
the deployment module is configured to, subsequent to the first release object being assigned to the first environment:
configure the first environment according to the specified version of the first set of deployment parameters,
copy, to the first environment, an executable form of the first application pointed to by the specified version of the first set of deployment parameters, and
initiate execution of the copied executable form in the first environment.

2. The software deployment system of claim 1 wherein the first set of deployment parameters includes parameters specifying deployment of the first application to a second environment of the plurality of environments.

3. The software deployment system of claim 2 wherein the deployment module is configured to, subsequent to the first release object being assigned to the second environment:
configure the second environment according to the specified version of the first set of deployment parameters;

copy, to the second environment, an executable form of the first application pointed to by the specified version of the first set of deployment parameters to the second environment; and initiate execution of the copied executable form in the second environment.

4. The software deployment system of claim 1 wherein the executable form of the first application comprises at least one of a binary file, a container image, a virtual machine image, a bytecode file, and an archive format file.

5. The software deployment system of claim 1 wherein the pointer is one of a uniform resource identifier (URI) and a uniform resource locator (URL).

6. The software deployment system of claim 5 wherein the pointer to the executable form of the first application indicates a file within an artifact repository.

7. The software deployment system of claim 1 wherein the storage module is configured to receive the pointer from an automated build manager that creates the executable form of the first application based on source code for the first application.

8. The software deployment system of claim 7 wherein the storage module is configured to receive a new version of the pointer from the automated build manager in response to creation, by the automated build manager, of a new executable form of the first application in response to revised source code for the first application.

9. The software deployment system of claim 1 wherein the deployment module is configured to configure the first environment by at least one of creating a container and spooling up a virtual machine (VM).

10. The software deployment system of claim 1 wherein the first set of deployment parameters specifies at least one of environment variables for deployment and network routes for intercommunication with other components while deployed.

11. The software deployment system of claim 1 further comprising:
a secrets control module that stores, in encrypted form, a plurality of secrets,
wherein the deployment module is configured to, in response to the first set of deployment parameters identifying a first secret, pass the first secret from the secrets control module to the executable form of the first application.

12. The software deployment system of claim 11 wherein the deployment module is configured to pass the first secret to the executable form as an environment variable.

13. The software deployment system of claim 1 wherein the deployment control system is configured to selectively promote the first release object from the first environment to a second environment and from the second environment to a third environment.

14. The software deployment system of claim 13 wherein the first, second, and third environments are configured for development, integration testing, and production, respectively.

15. The software deployment system of claim 1 wherein:
the release module is configured to generate a new release object in response to a request for a release and
in the new release object, the specific version of one of the plurality of sets of deployment parameters is a version of the set of deployment parameters at the time of the request.

16. The software deployment system of claim 1 wherein:
the storage module is implemented by a version control system;
the first set of deployment parameters comprises at least one text file in the version control system; and
in the first release object, the identifier of the specified version of the first set of deployment parameters is a snapshot in time of the at least one text file in the version control system.

17. The software deployment system of claim 1 further comprising a release database configured to store the release objects.

18. The software deployment system of claim 1 wherein, for each of the release objects, the specific version of the specified set of the plurality of sets of deployment parameters is immutable.

19. The software deployment system of claim 1 wherein:
the storage module is implemented by a version control system and
each set of the plurality of sets of deployment parameters comprises at least one text file in the version control system.

20. The software deployment system of claim 19 wherein the version control system is a distributed version control system.

* * * * *